(12) United States Patent
Cunningham et al.

(10) Patent No.: US 11,722,166 B2
(45) Date of Patent: *Aug. 8, 2023

(54) MOBILE DEVICE CASE SYSTEM

(71) Applicant: Peak Design, San Francisco, CA (US)

(72) Inventors: Joseph Cunningham, San Francisco, CA (US); Kiran Malladi, San Francisco, CA (US); Peter Dering, San Francisco, CA (US); Matthew Thomas James, San Francisco, CA (US); Arthur Viger, San Francisco, CA (US); Jaimee Erickson, San Francisco, CA (US)

(73) Assignee: PEAK DESIGN, San Francisco, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/503,200

(22) Filed: Oct. 15, 2021

(65) Prior Publication Data

US 2022/0158677 A1 May 19, 2022

Related U.S. Application Data

(63) Continuation-in-part of application No. 17/071,961, filed on Oct. 15, 2020, now Pat. No. 11,211,963.

(51) Int. Cl.
*H04B 1/3888* (2015.01)
*H04M 1/04* (2006.01)
*H04M 1/02* (2006.01)

(52) U.S. Cl.
CPC ................................. *H04B 1/3888* (2013.01)

(58) Field of Classification Search
CPC ............ H04B 1/385; H04B 1/38888; H04B 2001/3855; H04B 2001/3861; H04M 1/02;

(Continued)

(56) References Cited

U.S. PATENT DOCUMENTS

| 719,426 A | 2/1903 | Boone |
|---|---|---|
| 2,643,143 A | 6/1953 | Torgny |

(Continued)

FOREIGN PATENT DOCUMENTS

| AU | 2007237197 B2 | 11/2012 |
|---|---|---|
| AU | 2014232533 B2 | 3/2017 |

(Continued)

OTHER PUBLICATIONS

International Search Report received in PCT/US2021/055306 dated Jan. 14, 2022.

(Continued)

*Primary Examiner* — Quochien B Vuong
(74) *Attorney, Agent, or Firm* — Licata & Tyrrell P.C.; Bridget C. Sciamanna

(57) ABSTRACT

One variation of a device case includes a device case body: configured to accept and retain a mobile device; defining a strap receptacle; and including a first set of magnetic features arranged across a base surface of the strap receptacle. The device case further includes a strap: coupled to the device case body; configured to seat within the strap receptacle in a retracted position; configured to accept a finger of a user in a deployed position; and including a second set of magnetic features configured to transiently couple to the first set of magnetic features to drive the strap from the deployed position to the retracted position and to retain the strap within the strap receptacle in the retracted position.

20 Claims, 17 Drawing Sheets

(58) Field of Classification Search
CPC ...... H04M 1/0202; H04M 1/04; H04M 1/185; G06F 1/163; G06F 1/1613; G06F 1/1628; G06F 1/1633; G06F 2200/1633; A45C 13/1069; A45C 13/30; A45C 2011/002; A45C 2011/003; A45C 2200/0516; A45C 2200/0525
See application file for complete search history.

(56) References Cited

U.S. PATENT DOCUMENTS

| | | | |
|---|---|---|---|
| 2,661,649 A | 12/1953 | Skinner | |
| 3,312,138 A | 4/1967 | Cumming | |
| 3,612,462 A | 10/1971 | Mooney et al. | |
| 4,274,301 A | 6/1981 | Katayama | |
| 4,317,552 A | 3/1982 | Weidler | |
| 4,380,407 A | 4/1983 | Donan, Jr. | |
| 4,798,273 A | 1/1989 | Ward | |
| 5,109,411 A | 4/1992 | O'Connell | |
| 5,232,304 A | 8/1993 | Huang | |
| 5,323,600 A | 6/1994 | Munshi | |
| 5,423,566 A | 6/1995 | Warrington et al. | |
| 5,429,381 A | 7/1995 | Mercat et al. | |
| 5,661,942 A | 9/1997 | Palmer | |
| 5,746,407 A | 5/1998 | Nakatani | |
| 5,752,711 A | 5/1998 | Moreau | |
| 5,845,885 A | 12/1998 | Carnevali | |
| 6,135,408 A | 10/2000 | Richter | |
| 6,149,116 A | 11/2000 | Won | |
| 6,234,042 B1 | 5/2001 | An | |
| 6,234,506 B1 | 5/2001 | Li | |
| 6,244,131 B1 | 6/2001 | Liao | |
| 6,378,815 B1 | 4/2002 | Lee | |
| 6,445,498 B1 | 9/2002 | Baun et al. | |
| 6,561,400 B2 | 5/2003 | Lee | |
| 6,609,686 B2 | 8/2003 | Malizia | |
| 6,827,319 B2 | 12/2004 | Mayr | |
| 6,877,915 B1 | 4/2005 | Wei | |
| 6,920,806 B2 | 7/2005 | Cutsforth | |
| D537,323 S | 2/2007 | Saez | |
| 7,273,203 B2 | 9/2007 | Carnevali | |
| 7,374,142 B2 | 5/2008 | Carnevali | |
| 7,398,952 B2 | 7/2008 | Carnevali | |
| 7,431,251 B2 | 10/2008 | Carnevali | |
| D588,903 S | 3/2009 | Carnevali | |
| 7,594,631 B1 | 9/2009 | Carnevali | |
| D608,771 S | 1/2010 | Hsu | |
| 7,731,140 B2 | 6/2010 | Carnevali | |
| 7,891,618 B2 | 2/2011 | Carnevali | |
| 8,020,828 B2 | 9/2011 | Carnevali | |
| 8,235,340 B2 | 8/2012 | Carnevali | |
| 8,261,954 B2 | 9/2012 | Lee | |
| 8,267,418 B1 | 9/2012 | Chuang | |
| 8,317,048 B2 | 11/2012 | Hajichristou et al. | |
| 8,380,264 B2* | 2/2013 | Hung | A45C 11/00 455/575.8 |
| 8,553,408 B2 | 10/2013 | Supran et al. | |
| 8,602,277 B2 | 12/2013 | Lee | |
| 8,602,376 B2 | 12/2013 | Vogel et al. | |
| 8,608,502 B2 | 12/2013 | Witter et al. | |
| 8,613,379 B2 | 12/2013 | Lee | |
| 8,627,990 B2 | 1/2014 | Nakajima et al. | |
| 8,636,429 B2 | 1/2014 | Chen | |
| 8,641,714 B2 | 2/2014 | Steiner et al. | |
| 8,708,151 B2 | 4/2014 | Whitten et al. | |
| 8,708,205 B2 | 4/2014 | Wotton | |
| 8,807,496 B2 | 8/2014 | Kessler et al. | |
| 8,830,663 B2 | 9/2014 | Child et al. | |
| 8,870,146 B2 | 10/2014 | Vogel et al. | |
| D718,612 S | 12/2014 | McSweyn et al. | |
| D726,175 S | 4/2015 | Tsai et al. | |
| 9,060,416 B2 | 6/2015 | Supran et al. | |
| D739,708 S | 9/2015 | McSweyn et al. | |
| D740,830 S | 10/2015 | Chu | |
| 9,185,953 B2 | 11/2015 | Whitten et al. | |
| 9,243,739 B2 | 1/2016 | Peters | |
| D749,596 S | 2/2016 | Khodapanah et al. | |
| 9,317,076 B2 | 4/2016 | Rayner | |
| 9,498,034 B2 | 11/2016 | Whitten et al. | |
| 9,592,871 B2 | 3/2017 | Whitten et al. | |
| 9,611,881 B2 | 4/2017 | Khodapanah et al. | |
| 9,651,069 B2 | 5/2017 | Aspinall et al. | |
| 9,689,527 B2 | 6/2017 | Franklin | |
| D792,415 S | 7/2017 | Tsai | |
| 9,700,114 B2 | 7/2017 | Whitten et al. | |
| 9,704,632 B2 | 7/2017 | Baca | |
| 9,765,921 B2 | 9/2017 | Vogel et al. | |
| 9,773,601 B2 | 9/2017 | Breiwa et al. | |
| 9,800,283 B2 | 10/2017 | Schmidt | |
| D804,413 S | 12/2017 | McSweyn et al. | |
| D805,085 S | 12/2017 | Xiang et al. | |
| 9,869,423 B2 | 1/2018 | Khodapanah et al. | |
| 9,872,544 B2 | 1/2018 | Ho | |
| 9,926,953 B2* | 3/2018 | Russell-Clarke | A45C 13/30 |
| D818,421 S | 5/2018 | Hu | |
| 10,036,507 B2 | 7/2018 | Vogel et al. | |
| 10,066,779 B2 | 9/2018 | Vogel et al. | |
| 10,078,346 B2 | 9/2018 | Lay et al. | |
| 10,088,096 B2 | 10/2018 | Minn et al. | |
| 10,125,921 B2 | 11/2018 | Khodapanah et al. | |
| 10,134,517 B2 | 11/2018 | Baca | |
| 10,192,665 B2 | 1/2019 | Breiwa et al. | |
| 10,215,330 B2 | 2/2019 | Vogel et al. | |
| D842,306 S | 3/2019 | Lindo et al. | |
| 10,237,384 B2* | 3/2019 | Holder | H04M 1/04 |
| D845,963 S | 4/2019 | Lindo et al. | |
| D846,543 S | 4/2019 | Chen | |
| D847,823 S | 5/2019 | Monsalve et al. | |
| D852,196 S | 6/2019 | Alves | |
| D852,681 S | 7/2019 | Peters et al. | |
| D854,021 S | 7/2019 | Alves | |
| 10,505,392 B2 | 12/2019 | McSweyn et al. | |
| D873,812 S | 1/2020 | Peters et al. | |
| 10,569,717 B2 | 2/2020 | Peters et al. | |
| 10,571,964 B2 | 2/2020 | Barnett et al. | |
| D877,741 S | 3/2020 | Leeds-Frank | |
| 10,616,388 B1* | 4/2020 | Lee | H04M 1/04 |
| 10,649,492 B2 | 5/2020 | Peters et al. | |
| 10,694,837 B1 | 6/2020 | Altschul et al. | |
| 10,795,438 B2* | 10/2020 | Wang | G06F 1/163 |
| 10,900,608 B2* | 1/2021 | Ahi | A45F 5/00 |
| 2002/0113185 A1 | 8/2002 | Ziegler | |
| 2005/0284991 A1 | 12/2005 | Saez | |
| 2006/0279098 A1* | 12/2006 | Shipley | A45F 5/00 294/25 |
| 2007/0040084 A1 | 2/2007 | Sturman et al. | |
| 2008/0224000 A1 | 9/2008 | Yang | |
| 2009/0250567 A1 | 10/2009 | Raynaud | |
| 2010/0019109 A1 | 1/2010 | Liu | |
| 2011/0147546 A1 | 6/2011 | Monsalve et al. | |
| 2011/0192857 A1 | 8/2011 | Rothbaum et al. | |
| 2011/0204111 A1 | 8/2011 | Lee | |
| 2011/0260016 A1 | 10/2011 | Johnson et al. | |
| 2011/0260017 A1 | 10/2011 | Monsalve et al. | |
| 2012/0050968 A1 | 3/2012 | Child et al. | |
| 2014/0355200 A1 | 12/2014 | Thiers | |
| 2015/0158545 A1 | 6/2015 | Lanz | |
| 2016/0036480 A1 | 2/2016 | Hirsch | |
| 2016/0134142 A1 | 5/2016 | Murphy | |
| 2018/0032104 A1 | 2/2018 | Schatz et al. | |
| 2019/0009850 A1 | 1/2019 | Peters | |
| 2019/0198212 A1 | 6/2019 | Levy | |
| 2019/0230205 A1 | 7/2019 | Lee | |
| 2019/0371504 A1 | 12/2019 | Breiwa et al. | |
| 2020/0093231 A1 | 3/2020 | Mora et al. | |
| 2022/0214602 A1 | 7/2022 | Zhu et al. | |

FOREIGN PATENT DOCUMENTS

| | | |
|---|---|---|
| CN | 101377711 A | 3/2009 |
| CN | 102758993 A | 10/2012 |
| CN | 202518427 U | 11/2012 |
| CN | 208191049 U | 12/2018 |
| CN | 212745681 U | 3/2021 |

(56) References Cited

FOREIGN PATENT DOCUMENTS

| | | |
|---|---|---|
| CN | 213479596 U | 6/2021 |
| CN | 215111698 U | 12/2021 |
| CN | 215111699 U | 12/2021 |
| DE | 202004017041 U1 | 1/2005 |
| EP | 0736447 A1 | 10/1996 |
| EP | 2925594 B1 | 1/2017 |
| FR | 2990406 B1 | 4/2014 |
| JP | H02779 B2 | 1/1990 |
| TW | M493509 U | 1/2015 |
| WO | 03033335 A1 | 4/2003 |
| WO | 2010017668 A1 | 2/2010 |
| WO | 2014078493 A1 | 5/2014 |
| WO | 2019227141 A1 | 12/2019 |
| WO | 2020055560 A1 | 3/2020 |
| WO | 2022047882 A1 | 3/2022 |
| WO | 2022047883 A1 | 3/2022 |

OTHER PUBLICATIONS

European Search Report Received in EP Application No. 20188805.4 dated Aug. 12, 2020; 11 pages.
Non-Final Office Action for U.S. Appl. No. 17/503,192 dated Aug. 3, 2022; 13 pages.
Office Action received in Chinese Patent Application No. 202010759718.4 dated Jun. 16, 2021.
Office Action received in ROC (Taiwan) Patent Application No. 109126037 dated Mar. 12, 2021 (English translation).
Office Action Received in ROC (Taiwan) Patent Application No. 110120758 with Search Report dated Sep. 30, 2021.

* cited by examiner

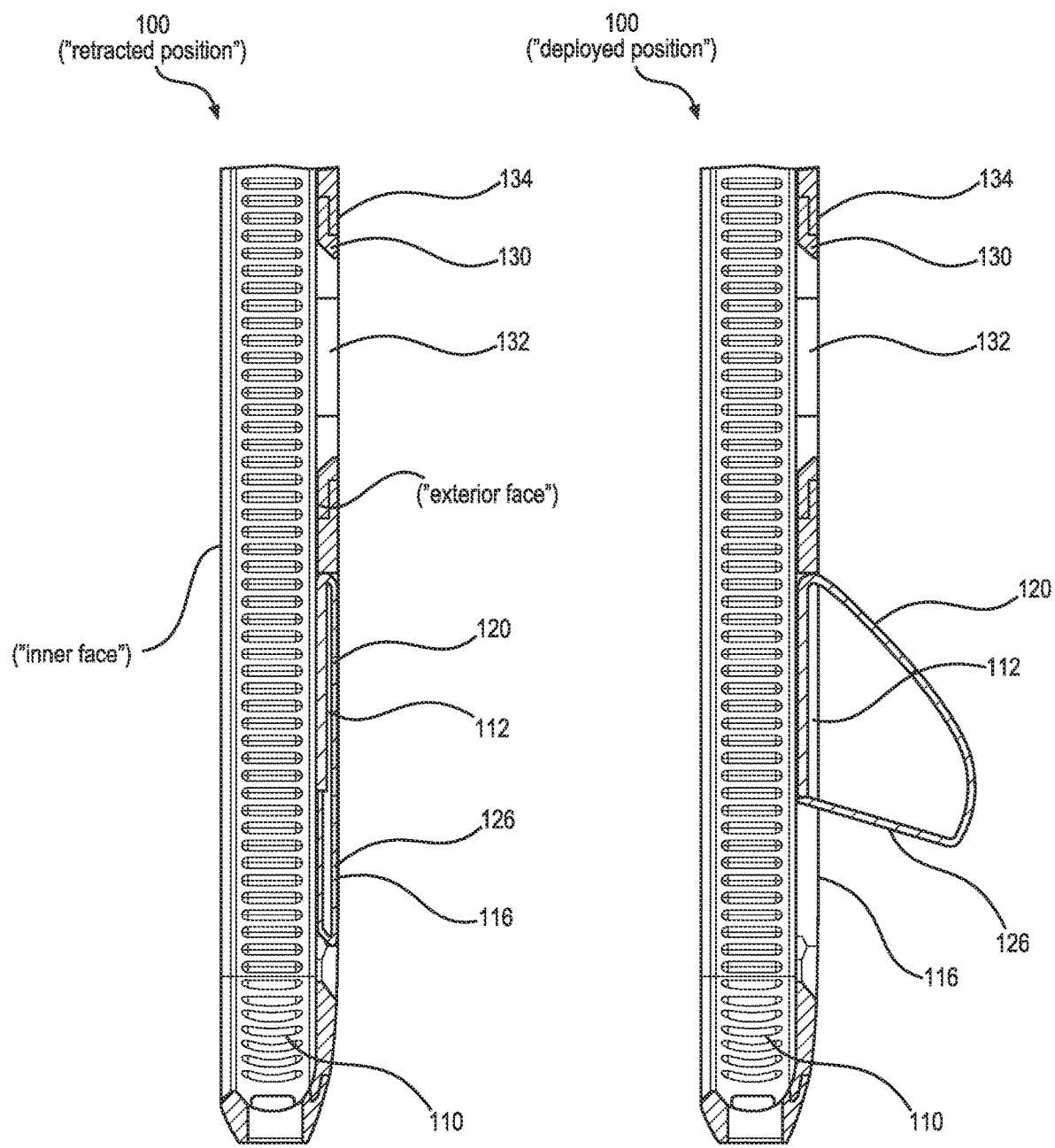

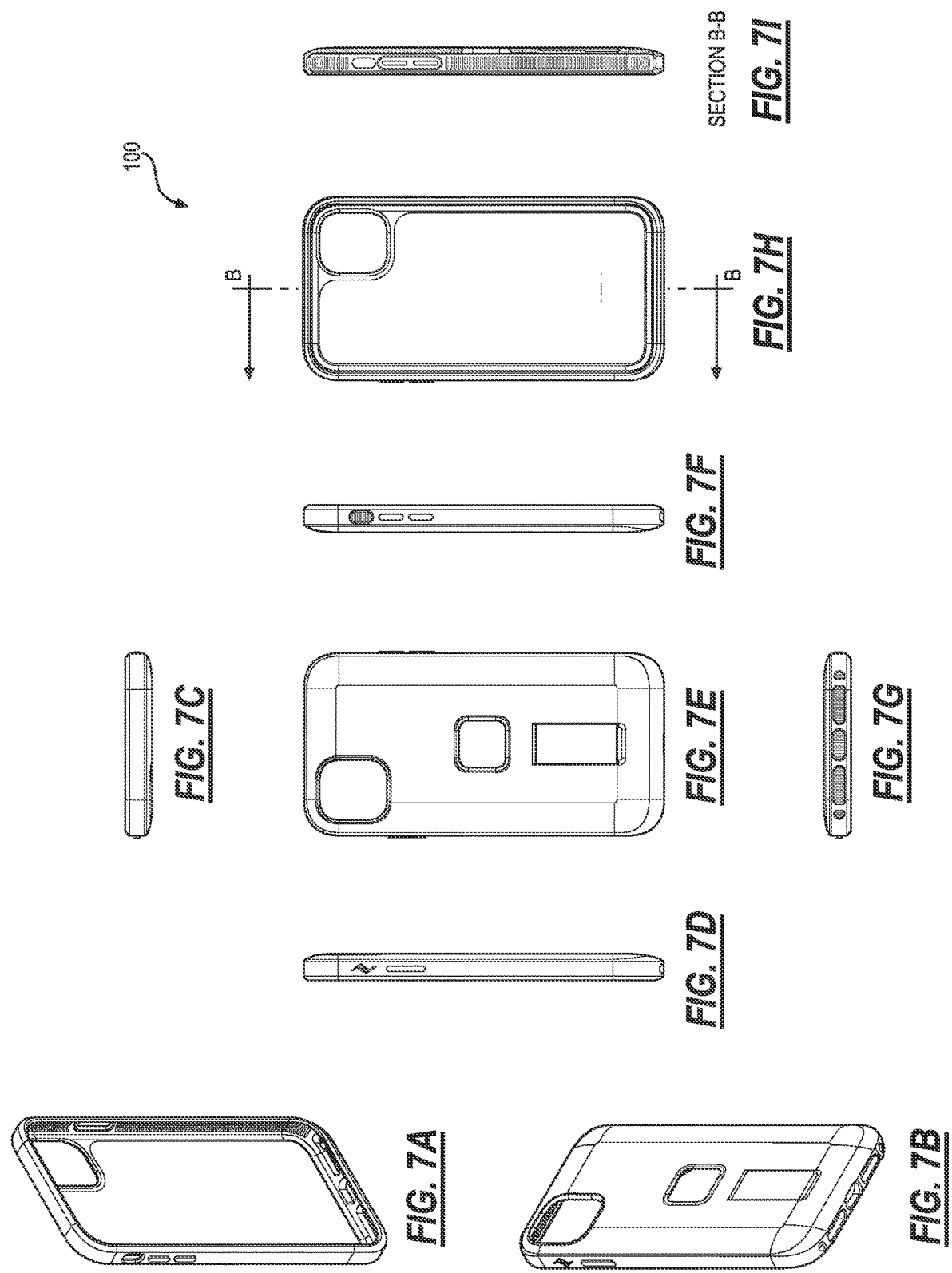

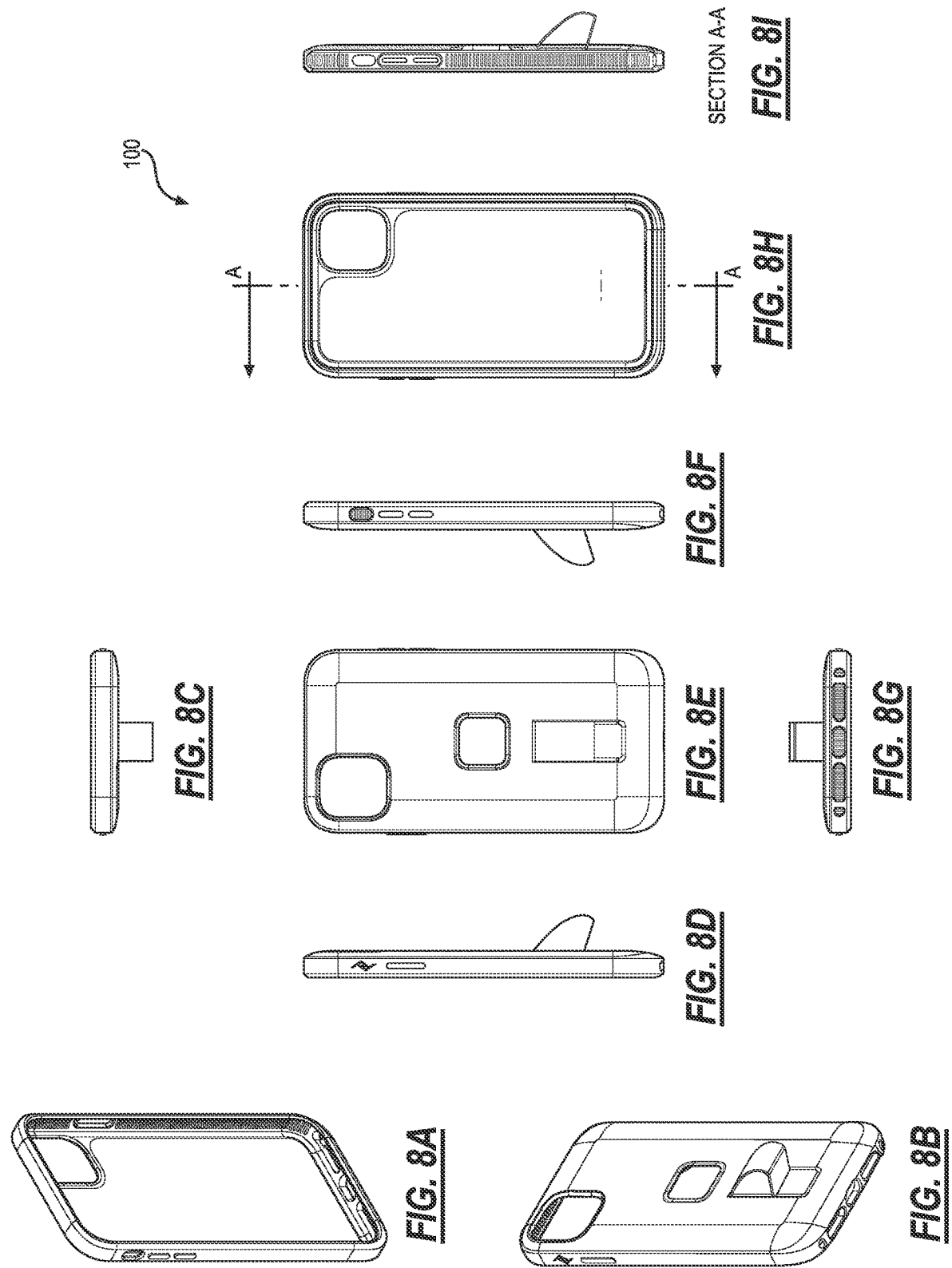

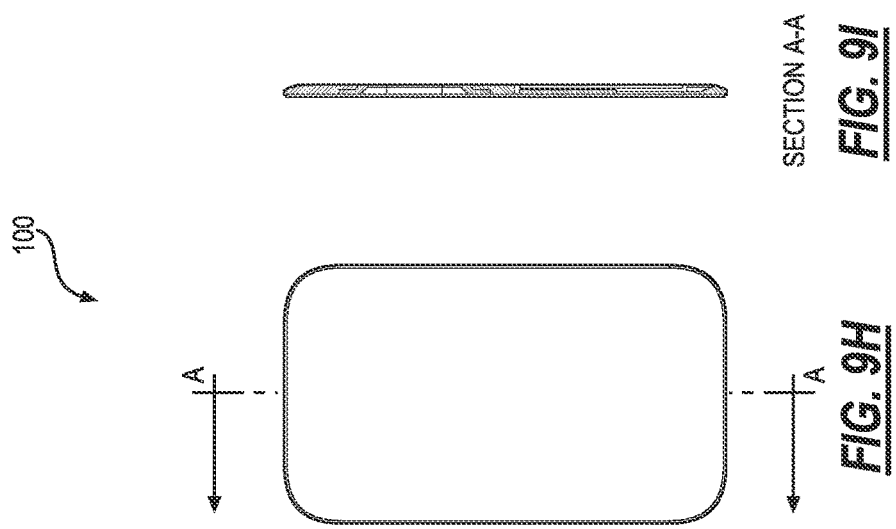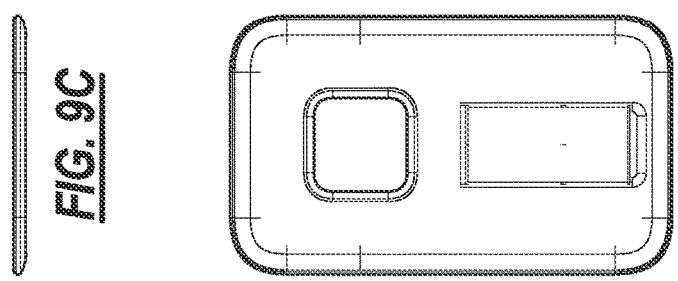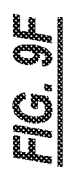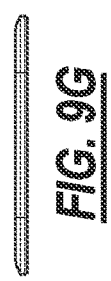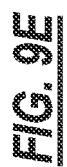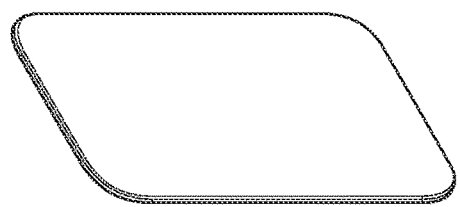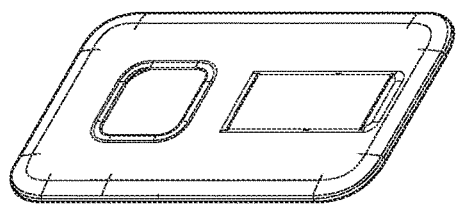

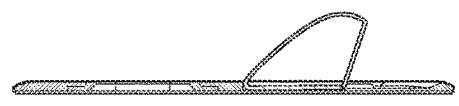
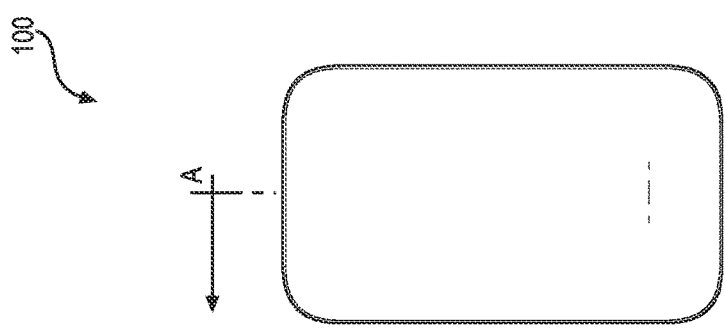
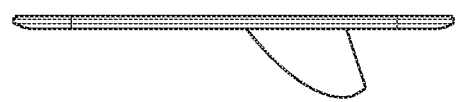
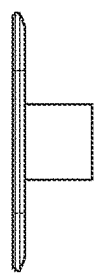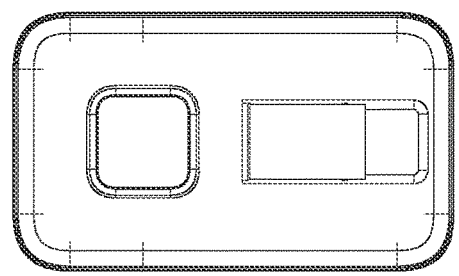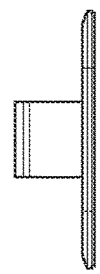
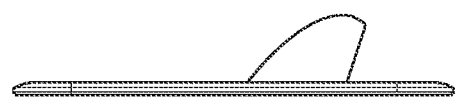
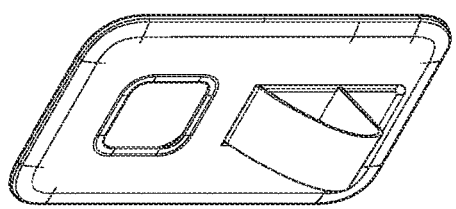
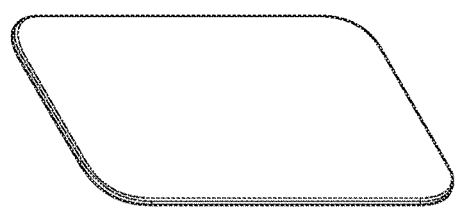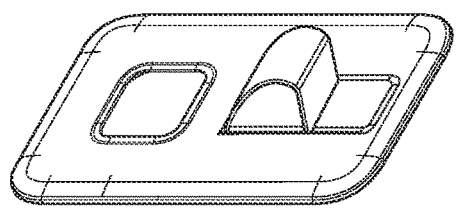

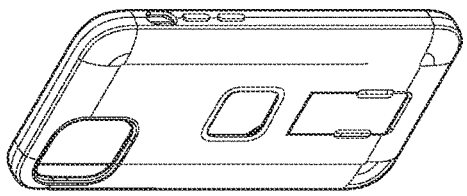
FIG. 11C
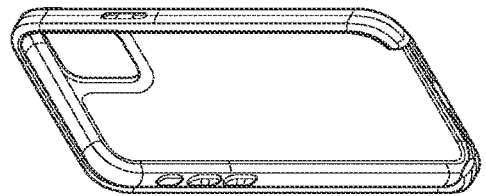
FIG. 11D
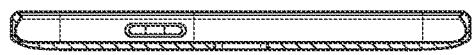
FIG. 11K
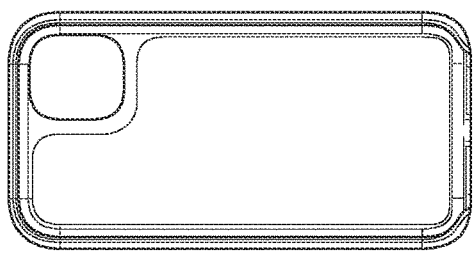
FIG. 11J
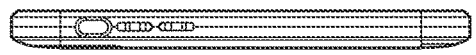
FIG. 11H
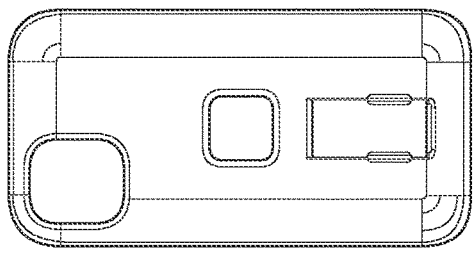
FIG. 11G
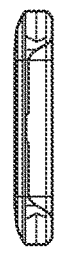
FIG. 11I
FIG. 11E
FIG. 11F
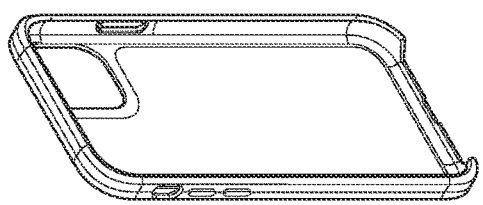
FIG. 11A
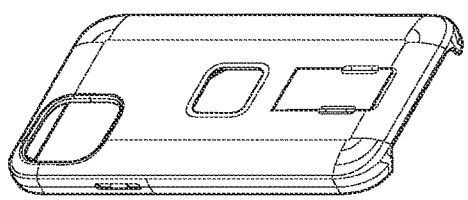
FIG. 11B

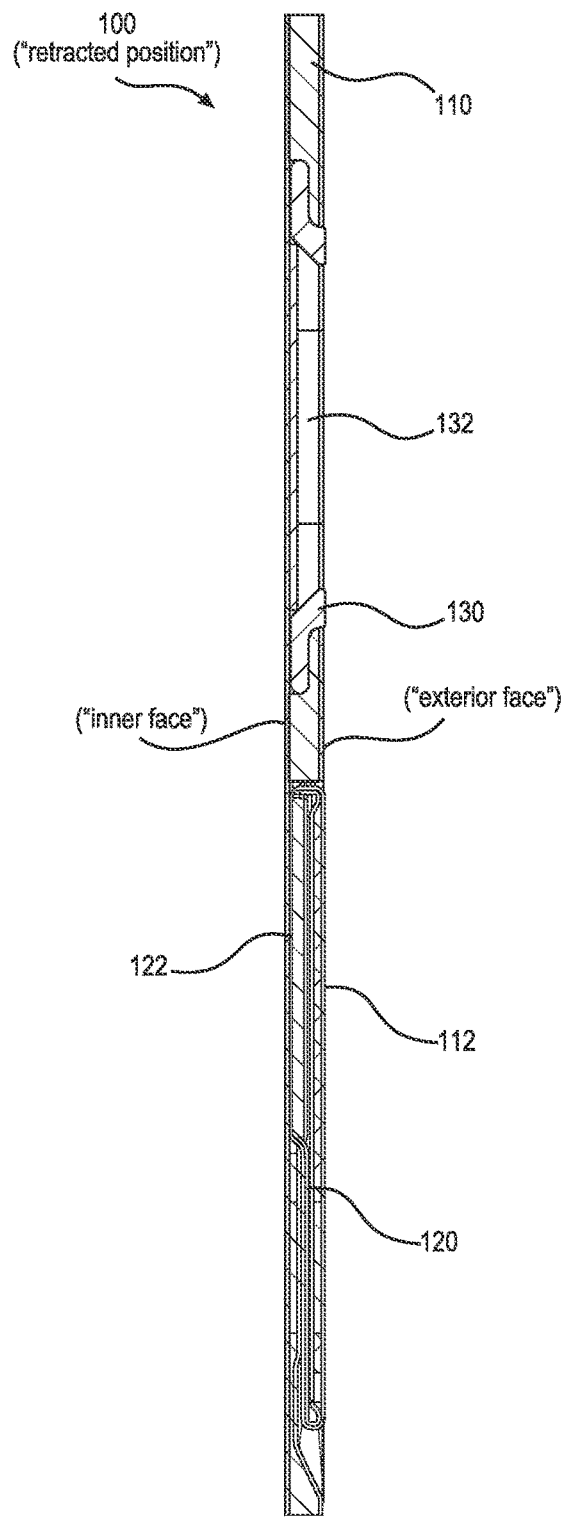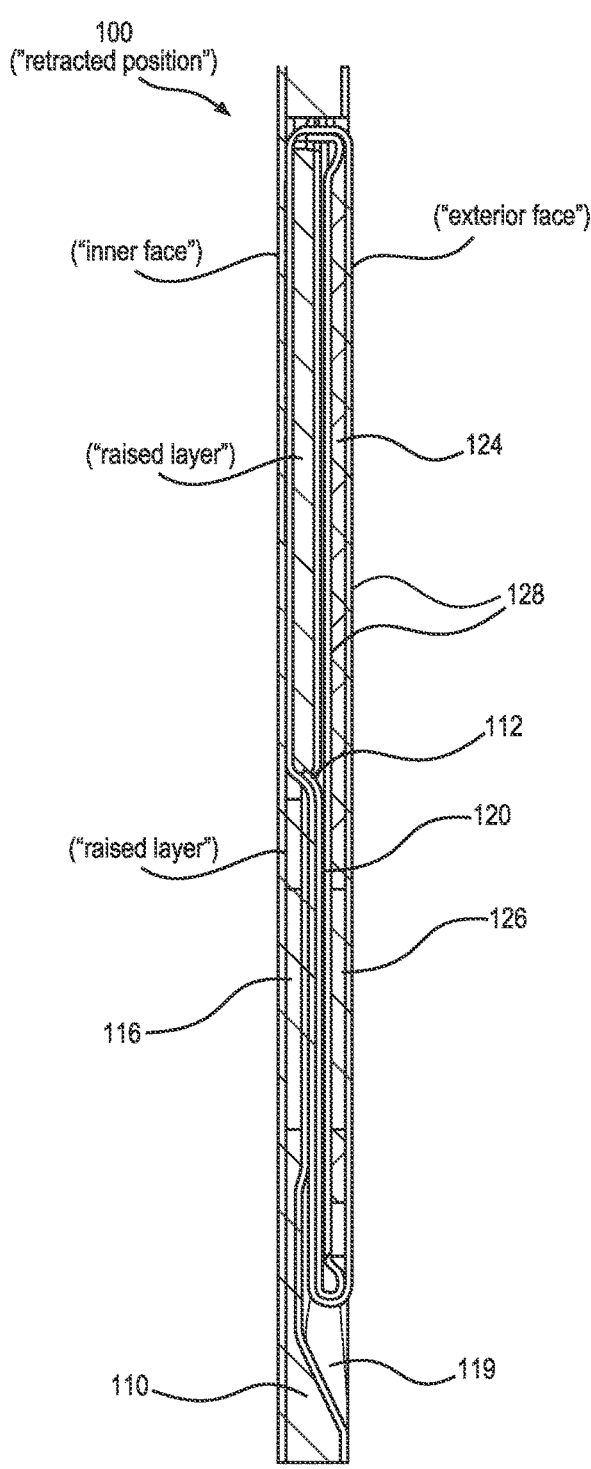
FIG. 16A
FIG. 16B

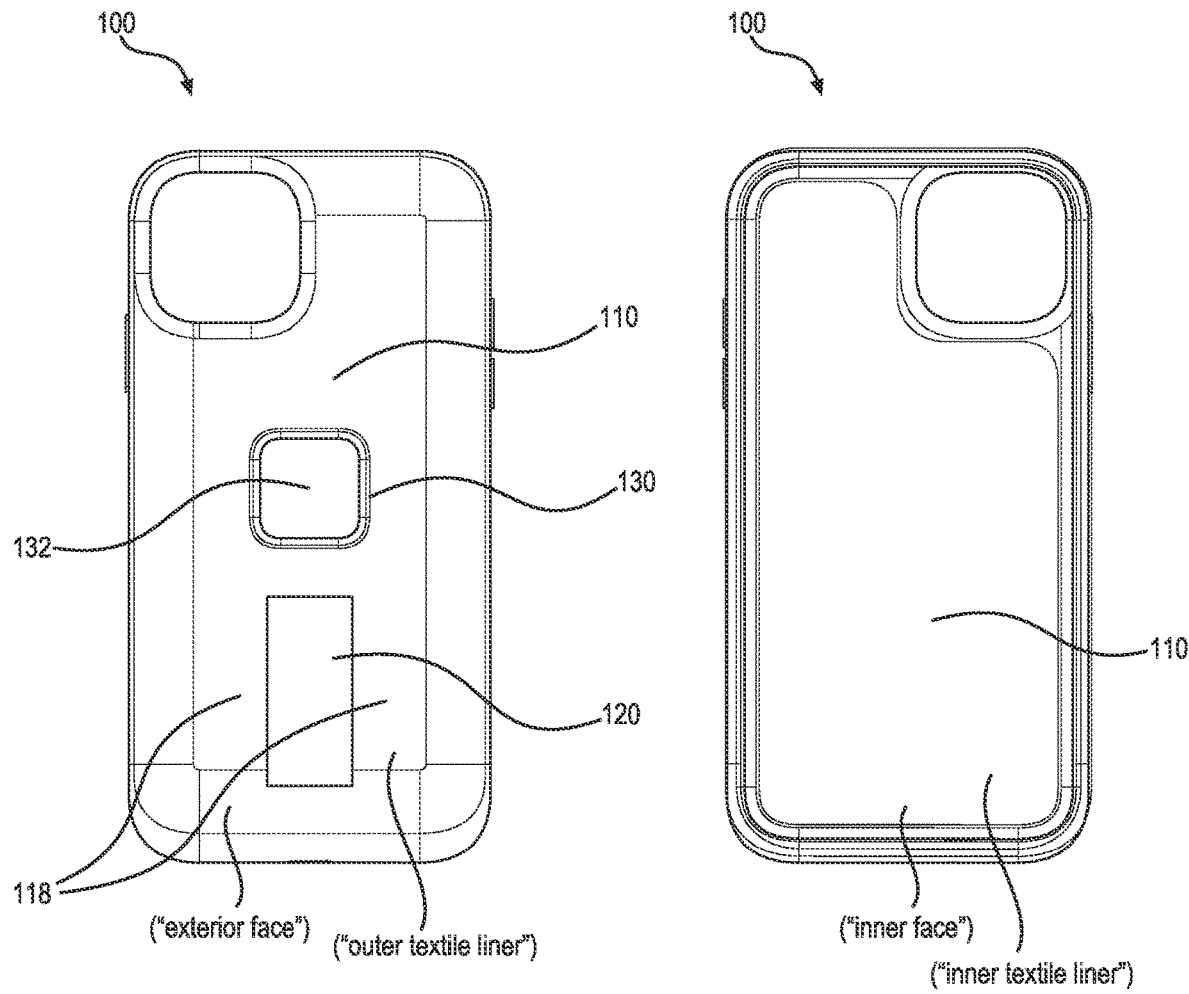

MOBILE DEVICE CASE SYSTEM

CROSS-REFERENCE TO RELATED APPLICATIONS

This Application claims the benefit and is a continuation-in-part of U.S. patent application Ser. No. 17/071,961, filed on Oct. 15, 2020, which is incorporated in its entirety by this reference.

This Application is related to U.S. patent application Ser. No. 17/067,612, filed on Oct. 9, 2020, which is a continuation-in-part of U.S. patent application Ser. No. 16/945,687, filed on Jul. 31, 2020, which claims the benefit of U.S. Provisional Application No. 62/881,217, filed on Jul. 31, 2019, each of which is incorporated in its entirety by this reference.

TECHNICAL FIELD

This invention relates generally to the field of mobile device accessories and more specifically to a new and useful device case in the field of mobile device accessories.

BRIEF DESCRIPTION OF THE FIGURES

FIGS. 4A and 4B is a schematic representation of the device case;

FIGS. 7A-7I are schematic representations of the device case;

FIGS. 8A-8I are schematic representations of the device case;

FIGS. 9A-9I are schematic representations of an adapter;

FIGS. 10A-10J are schematic representations of an adapter;

FIGS. 11A-11K are schematic representations of the device case;

FIGS. 16A and 16B are schematic representations of the device case; and

FIGS. 17A and 17B are schematic representations of the device case.

DESCRIPTION OF THE EMBODIMENTS

Figures 1A, 1B:
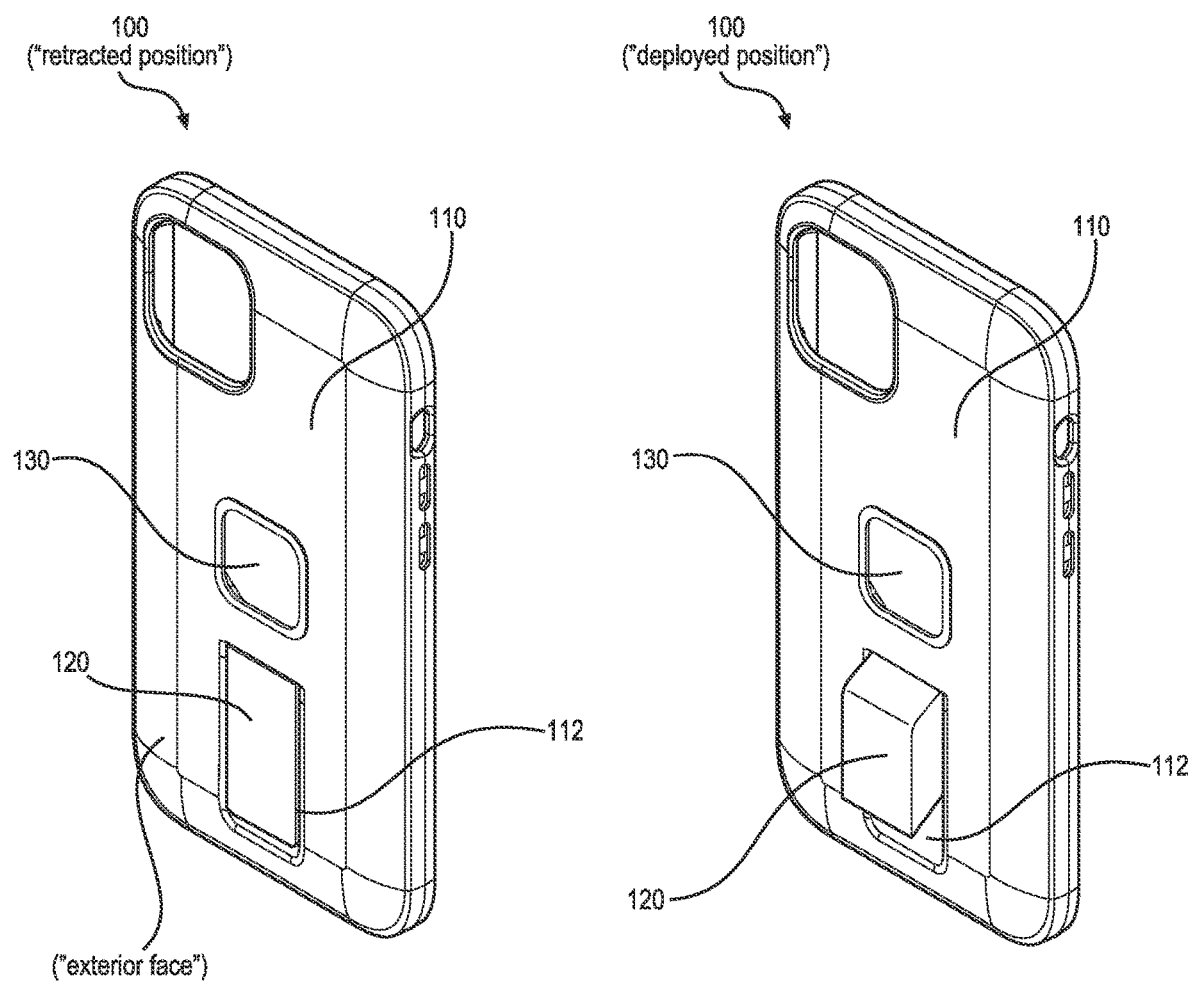
FIGS. 1A and 1B are schematic representations of a device case.
Figure 2:
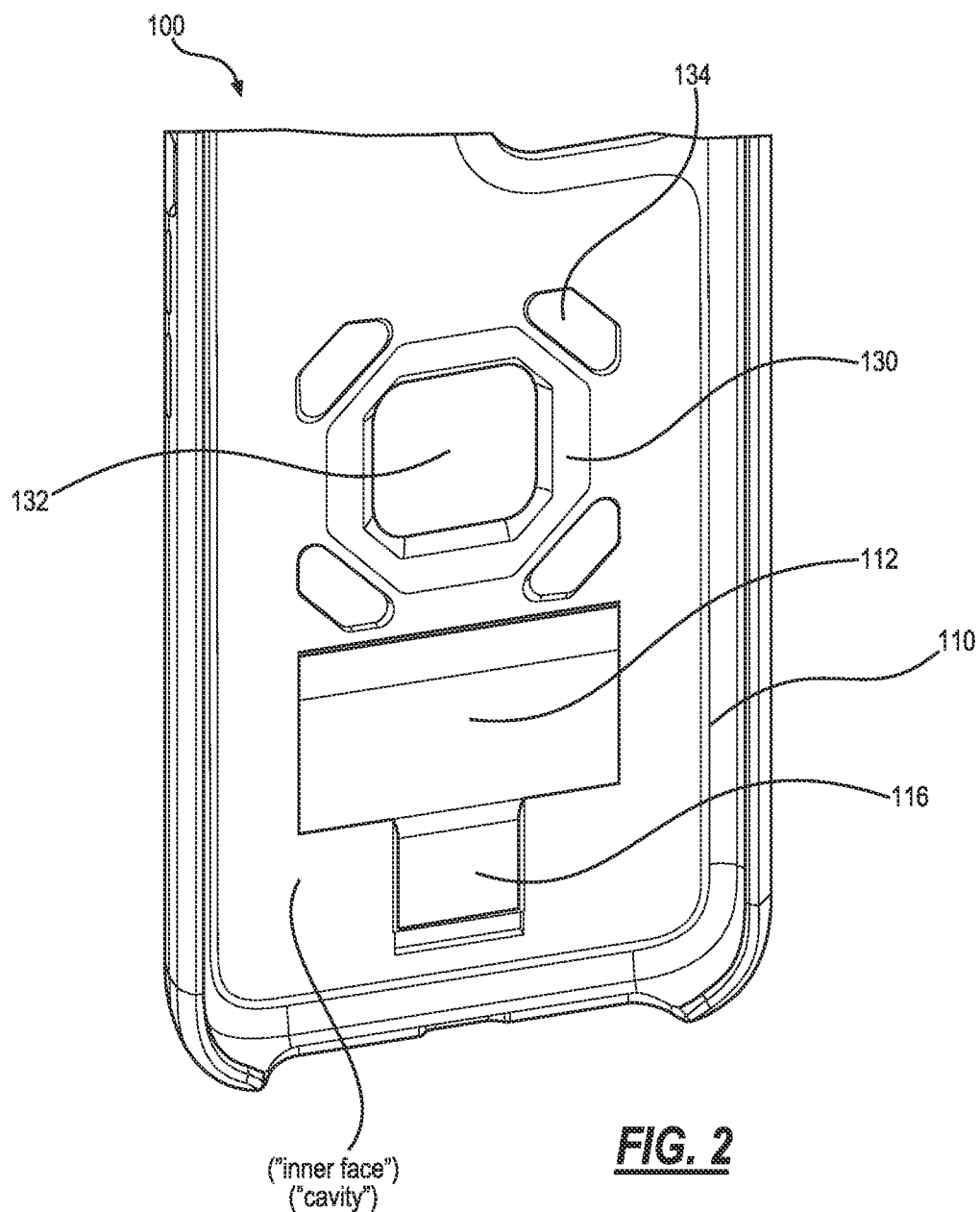
FIG. 2 is a schematic representation of the device case.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Device Case

As shown in FIGS. 1A-17, a device case 100 includes a device case body 110 (or "body"): defining a cavity extending from an inner face of the device case body 110 and configured to accept and retain a mobile device against the inner face; defining a strap receptacle 112; and including a first magnet arranged adjacent the strap receptacle 112. The device case 100 further includes a strap: flexibly coupled to the device case body 110; configured to seat within the strap receptacle 112 in a retracted position; and configured to extend outward from an exterior face of the device case body 110 opposite the inner face to accept a finger of a user in a deployed position. The strap 120 includes: a structural element configured to bias the strap 120 into a planar orientation within the strap receptacle 112 in the retracted position; a second magnet embedded in the structural element and configured to transiently couple to the first magnet of the device case body no to retain the strap 120 within the strap receptacle 112 in the retracted position; and a strap liner 128 encompassing the structural element and configured to contact the finger of the user during deployment of the strap 120.

One variation of the device case 100 includes a device case body 110: defining a cavity extending from an inner face of the device case body 110 and configured to accept and retain a mobile device; defining a strap receptacle 112; and including a magnetic plate arranged adjacent the strap receptacle 112. In this variation, the device case 100 includes a strap: flexibly coupled to the device case body 110; configured to seat within the strap receptacle 112 in a retracted position; and configured to extend outward from an exterior face of the device case body 110 opposite the cavity to accept a finger of a user in a deployed position. In this variation, the strap 120 includes: a structural element configured to bias the strap 120 into a planar orientation within the strap receptacle 112 in the retracted position; a magnet embedded in the structural element and configured to transiently couple to the magnetic plate of the device case body 110 to retain the strap 120 within the strap receptacle 112 in the retracted position; and a strap liner 128 encompassing the structural element and configured to contact the finger of the user during deployment of the strap 120.

One variation of the device case 100 includes a device case body 110: defining a cavity configured to accept and retain a mobile device; defining a strap receptacle 112; and including a first magnetic feature arranged adjacent the strap receptacle 112. In this variation, the device case further includes a strap: flexibly coupled to the device case body 110; configured to seat within the strap receptacle 112 in a retracted position; and configured to extend outward from an exterior face of the device case body 110 opposite the cavity to accept a finger of a user in a deployed position. In this variation, the strap 120 includes a second magnetic feature embedded in the structural element and configured to transiently couple to the first magnetic feature of the device case body 110 to retain the strap 120 within the strap receptacle 112 in the retracted position.

One variation of the device case 100 includes a device case body 110: configured to accept and retain a mobile device against an inner face of the device case body 110; defining a strap receptacle 112; and including a first set of magnetic features 116 arranged adjacent the strap receptacle 112. In this variation, the device case further includes a strap: flexibly coupled to the device case body 110; configured to retract in to seat flush with an exterior face of the device case body 110, opposite the inner face, within the strap receptacle 112 in a retracted position; and configured to open rearward from the exterior face of the device case body 110, away from the inner face, to accept a finger of a user in a deployed position. In this variation, the strap 120 includes: a set of structural elements 124 configured to bias the strap 120 into a planar orientation in the retracted position and contour about the finger of the user in the deployed position; and a second set of magnetic features 126 configured to transiently couple to the first set of magnetic features 116 of the device case body 110 to retain the strap 120 within the strap receptacle 112 in the retracted position. The strap 120 further includes a set of strap liners 128: encompassing the set of structural elements 124 and the second set of magnetic features 126; configured to contact the finger of the user during deployment of the strap 120; and including a set of coupling features 122 configured to couple the strap 120 to the device case body 110.

One variation of the device case 100 includes a device case body 110: configured to accept and retain a mobile device; defining a strap receptacle 112; and including a first set of magnetic features 116 arranged across a base surface of the strap receptacle 112. The device case 100 also includes a strap 120: coupled to the device case body 110; configured to seat within the strap receptacle 112 in a retracted position; configured to accept a finger of a user in an deployed position; and including a second set of magnetic features 126 configured to transiently couple to the first set of magnetic features 116 to drive the strap 120 from the deployed position to the retracted position and to retain the strap 120 within the strap receptacle 112 in the retracted position.

In one variation shown in FIGS. 1A-6B, 14A-16B, and 17A, the device case 100 further includes: an insert 130 comprising a rectangular bore 132 configured to accept a polygonal boss of a mount to constrain the device case 100 on the mount; and a first set of magnetic elements 134 arranged in a first pattern about the rectangular bore 132 and configured to transiently couple to a second set of magnetic elements arranged in a second pattern about the polygonal boss of the mount to transiently couple the device case 100 to the mount.

2. Applications

Generally, the device case 100 includes: a device case body 110 (or "body") configured to house a mobile device (e.g., a smartphone, a tablet); and a "soft" textile strap 120 coupled to the device case body no, configured to retract in to seat flush with the exterior face of the device case body no in a retracted position, and configured to open rearward from the device case body 110 to form a loop that accepts a finger of a user in an deployed position in order to secure the device case 100 to the finger of the user for added security when the user holds the mobile device.

In particular, the strap 120 can be configured to transition between a retracted position (e.g., stored within the device case body no with a first, outer section of the strap 120 resting flush with the outer surface of the device case body no) and an deployed position in which the strap 120 forms a continuous loop extending rearward from the device case body 110 and configured to accept the user's finger. The device case 100 can also include magnetic features configured to drive the strap 120 from the deployed position toward the retracted position and to retain the strap 120 in the close position with the first, outer section of the strap 120 resting flush with the outer surface of the device case body no as shown in FIGS. 1A and 14B. More specifically, device case body no: defines a strap receptacle 112 configured to house the strap 120 in the retracted position; and includes a first set of magnetic features 116 arranged across a base surface of the strap receptacle 112. The strap 120 includes: a textile loop bonded to or otherwise retained against the device case body 110 120 adjacent the recess; and a second set of magnetic features 126 configured to transiently couple to the first set of magnetic features 116 in the device case body 110 in order to drive the strap 120 from the deployed position to the retracted position and to retain (or "lock") the strap 120 within the strap receptacle 112 in the retracted position. The strap 120 can also include a set of stiffeners 124 (or "structural elements") embedded in the textile loop (e.g., within the first and second sections of the strap 120) and configured to bias the textile loop (e.g., the first and second sections of the strap 120 specifically) into a planar orientation such that the strap 120 falls into a flush arrangement with the exterior face of the device case body 110 in the retracted position.

The strap 120 defines an outer surface that seats substantially flush with an exterior face of the device case body 110 in the retracted position. For example, the device case body 110 can define a thickness between an inner face—configured to abut the mobile device—and the exterior face of the device case body 110 configured to enclose and shield the back surface of the mobile device. In particular, the strap receptacle 112 can define a depth approximating or slightly less than the thickness of the device case body 110. For example, the strap receptacle 112 can define a depth of two millimeters. The strap 120 can be configured to seat—in the retracted position—within the strap receptacle 112 with the first and second sections of the strap 120 (i.e., the outer surface of the strap 120) approximately (e.g., within two millimeters) flush with the exterior face of the device case body 110 such that the strap 120 does not visibly or tactilely protrude from or fall below the exterior face (i.e., the back surface) of the device case 100 and such that the exterior face of the device case 100 appears continuous, contiguous, cohesive, and smooth across its full width and height when the strap 120 occupies the retracted position.

Furthermore, by including the first set of magnetic features 116 of the device case body 110 and the second set of magnetic features 126 of the strap 120, the device case 100: retains the strap 120 in the flush arrangement with the exterior face of the device case body no when not in use; but also enables a user to rapidly deploy and release the strap 120 by overcoming magnetic coupling between these magnetic features with a single finger, such as by "flicking" an edge—formed by the second and third sections of the strap 120 in the retracted position—outwardly from the device case body no. The user may then insert a finger (e.g., her middle finger) into the loop formed by the strap 120 in order to mechanically constrain the device case and the mobile device to her hand. When the user later removes her finger from the loop, the first and second sets of magnetic features may magnetically couple to withdraw the strap 120 into the strap receptacle 112 and automatically retain (or "lock") the strap 120 within the strap receptacle 112.

2.1 User Example

For example, the user may wake in the morning and immediately grab her mobile phone to read her emails while reclined in her bed. To reduce hand fatigue from holding her mobile phone above her head while reclined, to increase mobile device security (i.e., by protecting the user from dropping her mobile phone), and to enable the user to easily manipulate (e.g., scroll over) the mobile phone's touchscreen with her thumb (i.e., rather than clutch the mobile phone between her thumb and other digits), the user may, in a single swift motion: slide her index finger across the exterior face of the device case body no (e.g., laterally across the exterior face of the device case body no); catch an edge of the strap 120 with a fingernail; "flick" the edge of the strap 120 outwardly from the exterior face of the device case body 110 to transition the strap 120 into the deployed position; then slide her index finger through a loop formed by the strap 120; and thus quickly and easily transition to holding mobile phone with her index finger via the strap 120. The user may then continue holding her mobile phone solely via her index finger inserted through the loop formed by the strap 120—without gripping the device case body 110 with her hand and/or other fingers—while browsing her emails with her thumb of the same hand. When the user is finished reading her emails, she may simply slide her finger out of the strap 120 and toss her mobile phone—housed within the device case—onto her bedside table or into her backpack for later use. When the user thus removes her finger from the strap 120, the magnetic features of both the strap 120 and the device case body no cooperate to automatically and swiftly return the strap 120 to the retracted position within the strap receptacle 112.

3. Device Case Body

The device case 100 includes a device case body 110 configured to accept and retain a mobile device (e.g., a smartphone, a tablet, a smartwatch). Generally, the device case body no: defines a strap receptacle 112 configured to transiently house a strap 120 coupled to the device case body 110; and includes a first set of magnetic features 116 configured to transiently couple to a second set of magnetic features 126 of the strap 120 to locate and retain the strap 120 within the strap receptacle 112.

In particular, the device case body no can define: a cavity configured to accept and retain the mobile device against the inner face of the device case body no; and a strap receptacle 112 configured to transiently house the strap 120—flexibly coupled to the device case body 110—approximately flush the exterior face of the device case body 110 opposite the inner face, such that a user may remove the strap 120 from the strap receptacle 112 to support her mobile device with one finger through the strap 120 (e.g., along the exterior face of the device case body no)—without clutching the mobile device with the rest of her hand—and continue viewing a screen of the mobile device (e.g., the user's view facing the inner face of the device case body 110). The device case body 110 can be configured to exhibit a particular thickness (or "body thickness") between the inner face and the exterior face (e.g., between a surface of the inner face and a surface of the exterior face), such that the strap 120 can seat within the strap receptacle 112—defining a depth from the exterior surface less than the body thickness of the device case body 110—approximately flush with the exterior face of the device case body 110.

The device case body 110 can include: a housing configured to accept and retain the mobile device within a cavity extending from the inner face of the device case body 110; and a strap receptacle 112 integrated into the housing and configured to accept the strap 120 on the exterior face of the device case body 110. In one implementation, the device case body 110 includes a polymer housing configured to accept and retain the mobile device. For example, the device case body 110 can include a polymer housing formed of a polycarbonate material (or a "polycarbonate housing"). In this example, the device case body 110 can be machined such that the strap receptacle 112 is integrated into this polycarbonate housing and configured to accept and retain the strap 120 flush with the exterior face of the device case body 110 (e.g., defined by polymer housing).

In one implementation, the device case body 110 can further include a set of fabric liners (e.g., textile liners) extending over surfaces of the housing. For example, the device case body 110 can include: an inner fabric liner extending across surfaces of the inner face; and an outer fabric liner extending across surfaces of the exterior fac (e.g., including surfaces of the strap receptacle 112). In this example, the device case body 110 can define a body thickness extending between an inner surface—defining the inner face of the device case body 110—of the inner fabric liner (e.g., configured to contact the mobile device when housed within the housing) and an outer surface—defining the exterior face of the device case body 110—of the outer fabric liner. Thus, in this example, the housing and the set of fabric liners can be configured such that the device case body 110 exhibit a particular body thickness including a first thickness of the inner fabric liner, a second thickness of the housing, and a third thickness of the outer fabric liner, such that the strap 120 seats flush with the outer surface of the outer fabric liner (i.e., the exterior face of the device case body 110) within the strap receptacle 112 in the retracted position.

3.1 Strap Receptacle

The device case body 110 can include a strap receptacle 112 configured to transiently house the strap 120 coupled to the device case body 110. The strap receptacle 112 can be integrated into the exterior face of the device case body 110, such that the strep seats flush in the device case body 110 and opens outward from the device case body 110 (e.g., away from the inner face) into the deployed position.

The strap receptacle 112 can define a depth approximately equivalent (e.g., within ten microns) a height of the strap 120 in the retracted position, such that an outer surface of the strap 120 in the retracted position seats flush with the exterior face of the device case body 110 (e.g., the outer surface of the outer textile liner).

In one implementation, the strap receptacle 112 can define a nonuniform depth, such that the outer surface of the strap 120 in the retracted position seats flush with the exterior face of the device case body 110. In particular, in this implementation, different sections of the strap 120 can be configured to exhibit nonuniform heights in the retracted position. Therefore, the strap receptacle 112 can be configured to exhibit a nonuniform depth (e.g., from the exterior face of the device case body no) across the strap receptacle 112 in order to offset differences in heights of the strap 120 when the strap 120 is closed in the retracted position within the strap receptacle 112.

For example, the strap receptacle 112 can define: a first region (e.g., an upper region) of the strap receptacle 112 exhibiting a first depth from the exterior surface of the device case body no; and a second region (e.g., a lower region) of the strap receptacle 112 exhibiting a second depth, greater than the first depth, from the exterior surface of the device case body no. In this example, a first strap section can be configured to seat within the first region of the strap receptacle 112 in the retracted position. Further, a second section and a third strap section can be configured to seat within the second region of the strap receptacle 112—the second section stacked over the third strap section—in the retracted position. The first section of strap can exhibit a first height approximating (e.g., within ten microns) the first depth of the first region. The second section can exhibit a second height approximating (e.g., within ten microns) the second depth of the second region.

The strap receptacle 112 can define a width less than a width of the device case body 110 and exceeding a threshold width such that the strap 120 can seat within the strap receptacle 112. In one implementation, the strap receptacle 112 defines a width approximating (e.g., within 10 microns) a width of the strap 120, such that the exterior face of the device case body no and the outer surface of the strap 120 appears continuous, contiguous, cohesive, and smooth across its full width and height when the strap 120 occupies the retracted position. In another implementation, the strap receptacle 112 defines a width greater than the width of the strap 120 such that a user may insert her finger into the strap receptacle 112 (e.g., along an edge of the strap receptacle 112 extending beyond the strap 120) to lift the strap 120 out of the strap receptacle 112 during deployment of the strap 120 into the deployed position.

3.2 Magnetic Features of the Device Case Body

The device case body 110 includes a first set of magnetic features 116 (e.g., one or more magnets, one or more magnetic plates, a ferrous material) arranged adjacent the strap receptacle 112 and configured to transiently couple with a second set of magnetic features 126 of the strap 120.

In one implementation, the device case body 110 includes a magnet arranged adjacent the strap receptacle 112 (e.g., along a surface of the strap receptacle 112) and configured to transiently couple with a magnetic feature (e.g., a magnet) of the strap 120. For example, the device case body 110 can include a first magnet configured to transiently couple with a second magnet in the strap 120. In this example, the first magnet can be embedded within the device case body 110 adjacent a base surface of the strap receptacle 112 configured to receive the strap 120 in the retracted position. In another implementation, the device case body 110 can include a magnetic plate arranged adjacent the strap receptacle 112 and configured to transiently couple with a magnetic feature (e.g., a magnet) of the strap 120. In another implementation, the device case body 110 can include a ferrous element arranged adjacent the strap receptacle 112 and configured to transiently couple with a magnetic feature (e.g., a magnet) of the strap 120.

In one implementation, the device case body 110 includes the first set of magnetic features 116 including a first subset of magnetic features arranged within a first region of the device case body 110 and a second subset of magnetic features arranged within a second region of the device case body no. The first subset of magnetic features can be configured to transiently couple to a third subset of magnetic features of the strap 120 and the second subset of magnetic features can be configured to transiently couple to a fourth subset of magnetic features of the strap 120.

For example, the device case body no can include the strap receptacle 112 defining an upper region and a bottom region arranged adjacent and below the upper region (e.g., with the device case body no in an upright position). The device case body no can include: a first magnet arranged adjacent the upper region of the strap receptacle 112 along the base surface of the strap receptacle 112; and a first magnetic plate (e.g., a steel plate) arranged adjacent the bottom region of the strap receptacle 112 along the base surface of the strap receptacle 112.

4. Strap

The device case 100 includes a strap 120 coupled to the device case body 110 and forming a loop configured to transiently accept a user's finger. The strap 120 can be rigidly coupled to the device case body 110 such that the user may insert her finger into the loop and carry both the device case 100 and her mobile device housed within the device case 100 without grasping the device case 100 with the rest of her fingers and/or hand. Generally, the strap 120 can be configured to contour about the user's finger (e.g., forming a loop around the user's finger) in a deployed position and to seat within the strap receptacle 112—an outer surface of the strap 120 approximately flush with the exterior face of the device case body 110—in a retracted position. The strap 120 can include a second set of magnetic features 126 configured to transiently couple with the first set of magnetic features 116 of the device case body 110 to drive the strap 120 from the deployed position into the retracted position within the strap receptacle 112 and to retain the strap 120 within the strap receptacle 112 in the retracted position.

In one implementation, the strap 120 can include: a set of structural elements 124 configured to bias the strap 120 into a planar orientation in the retracted position and contour about the finger of the user in the deployed position; and a second set of magnetic features 126 configured to transiently couple to the first set of magnetic features 116 of the device case body 110 to retain the strap 120 within the strap receptacle 112 in the retracted position. The strap 120 can also include a set of strap liners 128: encompassing the set of structural elements 124 and the second set of magnetic features 126; configured to contact the finger of the user during deployment of the strap 120; and including a set of coupling features 122 (e.g., a set of wings) configured to couple the strap 120 to the device case body 110.

The strap 120 can be configured to: transiently seat within the strap receptacle 112 of the device case 100 in the retracted position; transition from the retracted position to the deployed position in which the user may insert her finger through the strap 120 to support the device case 100 and her mobile device housed within the device case 100; and transition from the deployed position to the retracted position when the user no longer wishes to access the strap 120. For example, the device case 100 can retain the strap 120 in the retracted position within the strap receptacle 112 while the user carries her mobile phone—housed within the device case 100—in her pocket. Later, when the user removes her mobile device from her pocket while going for a walk, she may push her finger across a rear surface of the device case 100 to remove the strap 120 from the strap receptacle 112 in the retracted position and slide her finger through the loop formed by the strap 120 in the deployed position. The user may then comfortably carry her mobile phone via her finger inserted through the loop with confidence that her mobile device is securely coupled to her finger.

4.1 Strap Sections

As shown in FIGS. 1B, 4B, 5B, 6B, and 8A-8I, the strap 120 can be configured to form a loop such that the user may insert her finger through the loop to support and/or hold her mobile device housed within the device case 100. For example, the strap 120 can include a set of sections forming the loop, such that a first strap section couples to a last strap section to form the loop.

In one implementation, the strap 120 can include: a first section curving outwardly from the device case body no when the strap 120 is in the deployed position; a second section approximately parallel the device case body no (e.g., with curved ends) when the strap 120 is in the deployed position; and a third section curving inwardly toward the device case body no when the strap 120 is in the deployed position. In this implementation, the strap 120 can include a set of coupling features 122 coupled to the strap 120 (e.g., extending from the first and third sections of the strap 120) and configured to couple the strap 120 to the device case body no.

In another implementation, the strap 120 can include: the first section curving outwardly from the device case body no when the strap 120 is in the deployed position; the second section approximately parallel the device case body no (e.g., with curved ends) when the strap 120 is in the deployed position; and the third section curving inwardly toward the device case body no when the strap 120 is in the deployed position. In this implementation, the strap 120 can also include a fourth section (or "base section"): parallel and/or coupled to the base surface of the strap receptacle 112; and coupled to the first strap section.

In one implementation, the strap 120 can include a set of hinges between sections of the loop. For example, the strap 120 can include: a first hinge between the first section of the loop and the second section of the loop; a second hinge between the second section of the loop and the third section of the loop; and a third hinge between the third section of the loop and the fourth section of the loop. In another example, the strap 120 can include: a first hinge between the second section and the third section of the loop; and a second hinge between the third section and the fourth section of the loop. In this example, the strap 120 includes no hinge between the first and second sections of the loop, such that the loop fits more snugly to the user's finger, while hinges between the second and third sections and third and fourth sections enable the loop to readily transition between the open and retracted positions.

In one implementation, the strap 120 can be configured to contour around the user's finger in the deployed position, such that strap 120 forms a loop around the user's finger with no (or minimal) gaps present between the strap 120 and the user's finger. Thus, in this implementation, the strap 120 can include the set of stiffeners 124 (e.g., flexible plastic, fabric) extending between sections of the strap 120 such that these connections between sections bend and/or contour to the user's finger. For example, the strap 120 can include a single stiffener extending across sections of the loop. In this example, the single stiffener can include a set of cutouts (e.g., a first cutout in the first section, a second cutout in the second section, and a third cutout in the third section) configured to house the second set of magnetic features 126 of the strap 120.

4.2 Magnetic Features of the Strap

The strap 120 includes the second set of magnetic features 126 configured to couple to the first set of magnetic features 116 of the device case body no. Sections of the strap 120 can be configured to include a subset of magnetic features, in the second set of magnetic features 126, such that the second set of magnetic features 126 are distributed within the strap 120 in a particular arrangement that enables coupling between the first set of magnetic features 116 of the device case body 110 and the second set of magnetic features 126 of the strap 120 when the strap 120 is in the retracted position.

In one implementation, the strap 120 can include a second magnetic feature (e.g., a magnet, a magnetic plate, a ferrous element) arranged within the strap 120 and configured to couple to a first magnetic feature (e.g., a magnet, a magnetic plate, a ferrous element) of the device case body 110. For example, the strap 120 can include a magnet arranged within a section of the strap 120 (e.g., the second strap section) configured to seat above the first magnetic feature of the device case body no in the retracted position, such that the second magnetic feature couples with the first magnetic feature to retain the strap 120 within the strap receptacle 112.

In another implementation, the strap 120 includes: a first subset of magnetic features arranged in the first strap section; a second subset of magnetic features arranged in the second strap section; and a third subset of magnetic features arranged in the third strap section. Each of these subsets of magnetic features, in the second set of magnetic features 126, can be configured to couple to magnetic features, in the first set of magnetic features 116, of the device case body 110. For example, the strap 120 can include: a first magnet arranged within the first strap section; a steel plate arranged within the second strap section; and a second magnet arranged within the third strap section. In another example, the strap 120 can include: a first magnet arranged within the first strap section and configured to transiently couple with a first magnetic feature, in the first set of magnetic features 116, of the device case body no; and a second magnet arranged within the second strap section and configured to transiently couple with a second magnetic feature, in the first set of magnetic features 116, of the device case body no. Additionally, in this example, the strap 120 can include a magnetic feature (e.g., a magnet, a magnetic plate, a ferrous element) arranged within the third strap section and configured to transiently couple to both the second magnet arranged within the second strap section and the second magnetic feature of the device case body 110 in the retracted position.

4.3 Strap Stack

As shown in FIGS. 4A, 4B, 13A, and 13B, each strap section can include multiple layers forming a strap stack in the retracted position within the strap receptacle. In particular, in the retracted position, the stack can define a height approximately equivalent (e.g., within five microns) a depth of the strap receptacle 112 of the device case body 110 such that the outer surface of the strap 120 seats approximately flush with (e.g., within 10 microns of) the exterior face of the device case body no (e.g., defined by the outer surface of the outer fabric liner of the device case body 110). For example, with the strap 120 in the retracted position: the layers of the first strap section (e.g., including the strap liner 128 and the stiffener 124) stack to achieve a height approximating a depth of the strap receptacle 112 occupied by the first strap section; and the layers of the second strap section (e.g., including the strap liner 128, the stiffener 124, and the magnetic feature 116 embedded in the stiffener 124) and third strap section (e.g., including the strap liner 128) similarly stack to achieve a height approximating a depth of the strap receptacle 112 occupied by the second and third strap sections.

In one implementation, the device case body 110 can include a set of fabric liners, thereby extending a thickness of the device case body 110. In this implementation, the strap 120 can define a height—in the retracted position—approximately extending from the base surface of the strap receptacle 112 to an outer surface of the outer textile liner. For example, the device case body 110 can define a total thickness (e.g., between 2.0 millimeters and 3.2 millimeters) and include: an inner textile liner defining an inner liner thickness (e.g., between 0.2 millimeters and 0.3 millimeters); a polymer housing defining a housing thickness (e.g., between 1.5 millimeters and 2.5 millimeters); and an outer textile liner defining an outer textile thickness (e.g., between 0.2 millimeters and 0.3 millimeters). Thus, in this example, the strap 120 can define a height—in the retracted position—approximating a distance between the base surface of the strap receptacle 112 and the outer surface of the outer textile liner (e.g., a depth of the strap receptacle 112 plus the outer textile thickness).

4.3.1 Structural Elements

Segments of the strap 120 can also include a set of structural elements 124 (or "stiffeners") formed of a thin, stiff material, such as plastic (e.g., nylon sheet), spring steel (e.g., shim stock), or a stiff fabric (e.g., a nylon laminate twill). In particular, these stiffeners can: increase rigidity of the loop formed by the strap 120 and thus prevent the loop from twisting as the user slides a finger into the loop; and bias their corresponding segments of the strap 120 into a flat, planar arrangement (e.g., in the retracted position). In one implementation, the set of stiffeners 124 can be formed of a flexible material (e.g., a flexible plastic, a fabric) such that the strap 120 is readily operable in both the deployed position (e.g., in a loop shape) and the retracted position (e.g., laid flat within the strap receptacle 112 of the device case body no) and can contour to the user's finger in the deployed position. The second set of magnetic features 126 can be arranged within (e.g., flush with, embedded within) the set of stiffeners 124. Alternatively, the second set of magnetic features 126 can seat above or below the set of stiffeners 124 within the strap 120.

In one implementation, sections of the strap 120 (e.g., the first section, second section, and third section) can each include a discrete stiffener, in the set of stiffeners 124, such that the discrete stiffener does not extend between sections of the strap 120. For example, the strap 120 can define a first strap section including: a first rectangular plastic stiffener defining a first cutout (e.g., circular, rectangular) in a center of the first rectangular plastic stiffener, the first cutout and the first rectangular plastic stiffener defining a first area; and a first magnet configured to fit within the first cutout of the first rectangular plastic stiffener. The strap can also define a second strap section including: a second rectangular plastic stiffener defining a second cutout in a center of the second rectangular plastic stiffener, the second cutout and the second rectangular plastic stiffener defining a second area approximating the first area; and a first steel plate configured to fit within the second cutout of the second rectangular plastic stiffener. The strap 120 can further define a third strap section including: a third rectangular plastic stiffener defining a third cutout in a center of the third rectangular plastic stiffener, the third cutout and the third rectangular plastic stiffener defining a third area approximating the first and second area; and a second round magnet configured to fit within the third cutout of the third rectangular plastic stiffener.

In another implementation, strap sections can include a single contiguous stiffener extending between adjacent strap sections. The single contiguous stiffener can be formed of a flexible material such that the loop contours to the user's finger. For example, the strap 120 can include a first stiffener: extending between the first strap section and the second strap section; defining a first cutout configured to seat within the first strap section; and defining a second cutout configured to seat within the second strap section. In this example, the first strap section can include a first magnetic element seated within the first cutout of the first stiffener. The second strap section can include a magnetic plate seated within the second cutout of the first stiffener. In this example, the strap 120 can also include a second stiffener—discrete from the first stiffener—within the third strap section, such that the strap 120 defines a hinge between the second and third strap sections. Therefore, the first strap section and the second strap section form a continuous strap section connected via the first stiffener with no hinge between these strap sections. Thus, when the user removes her finger from the strap 120 in the deployed position and the first magnetic element in the first strap section magnetically couples to a corresponding magnetic element in the device case body no, the single contiguous stiffener further drives the second strap section 120—and the magnetic plate within the second strap section—toward the device case body no and a corresponding magnetic element with the device case body no.

In another example, as shown in FIGS. 3, 4A, 4B, 13A and 13B, the strap 120 can include a stiffener extending between the first strap section and the second strap section. In this example, the strap 120 can include a second magnetic feature 126 (e.g., a magnet, a magnetic plate, a ferrous element) embedded within the stiffener and within the second strap section. In this example, the second strap section can be configured to seat over the third strap section (e.g., folding inward beneath the second strap section) in the retracted position, within the strap receptacle 112. to couple to a first magnetic feature 116 of the device case body no. Therefore, by including a single stiffener extending between the first and second strap sections, the first and second strap sections can be configured to seat in a planar orientation within the strap receptacle 112 in the retracted position, with the second magnetic feature 126 of the strap 120 coupled to the first magnetic feature 116 of the device case body 110, and the third strap section—excluding any stiffener or magnetic features—arranged between the first magnetic feature 116 and the second magnetic feature 126.

Alternatively, in one variation, the strap 120 excludes stiffeners. In this variation, the strap 120 can be formed of a material configured to enable flexibility and rigidity of the strap 120 without inclusion of the set of stiffeners 124. For example, the strap 120 can be formed of a pair of weighted fabrics bonded together. In this example, by excluding stiffeners from the strap 120, the strap 120 can incorporate a larger magnetic feature(s) (e.g., a thicker magnet) within the strap 120 due to the decrease in thickness from removing the stiffeners. Further, the strap 120 can exhibit more flexibility and therefore may be more comfortable to a user wearing the strap 120 around her finger.

4.3.2 Set of Strap Liners

The strap 120 can also include a set of strap liners 128 encompassing the set of stiffeners 124 and the second set of magnetic features 126 to form a loop with stiff segments separated by "living" textile hinges.

In one implementation, the set of strap liners 128 can include: a first strap liner 128 arranged across a first surface of the set of stiffeners 124; and a second strap liner 128 arranged across a second surface, opposite the first surface, of the set of stiffeners 124 and bonded to the first strap liner 128. For example, the strap 120 can include: a set of flexible plastic stiffeners each arranged within the strap 120 (e.g., one flexible plastic stiffener extending between sections of the strap 120, three flexible plastic stiffeners arranged in the first, second, and third segments of the strap 120) to increase rigidity of these sections of the loop; a first fabric layer arranged across the inner surfaces of these stiffeners and configured to transiently contact the user's finger when the strap 120 occupies the deployed position; and a second fabric layer arranged over the stiffeners opposite the first fabric layer and cooperating with the second fabric layer to enclose the stiffeners.

Figure 13A:
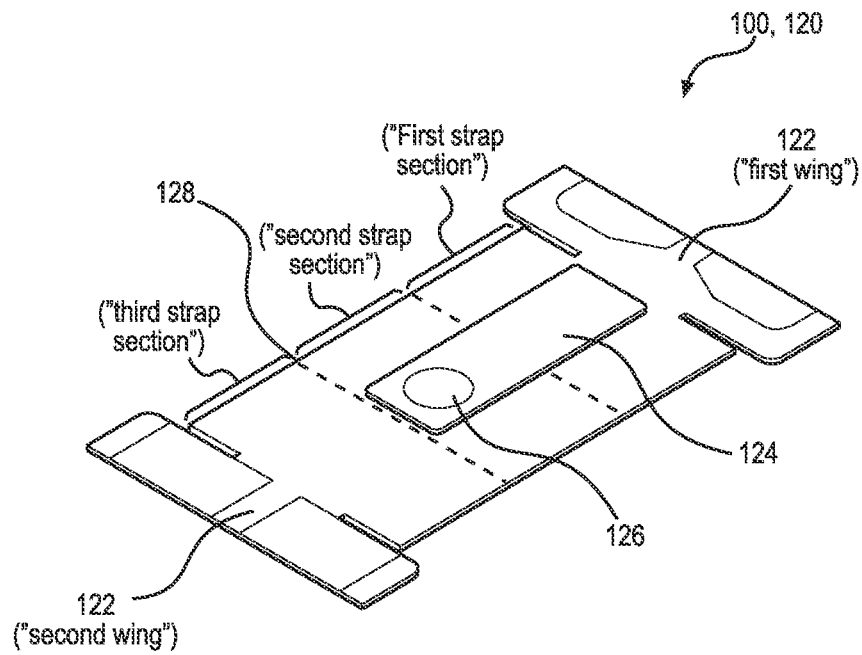
FIGS. 13A and 13B are schematic representations of a strap.
Figure 13B:
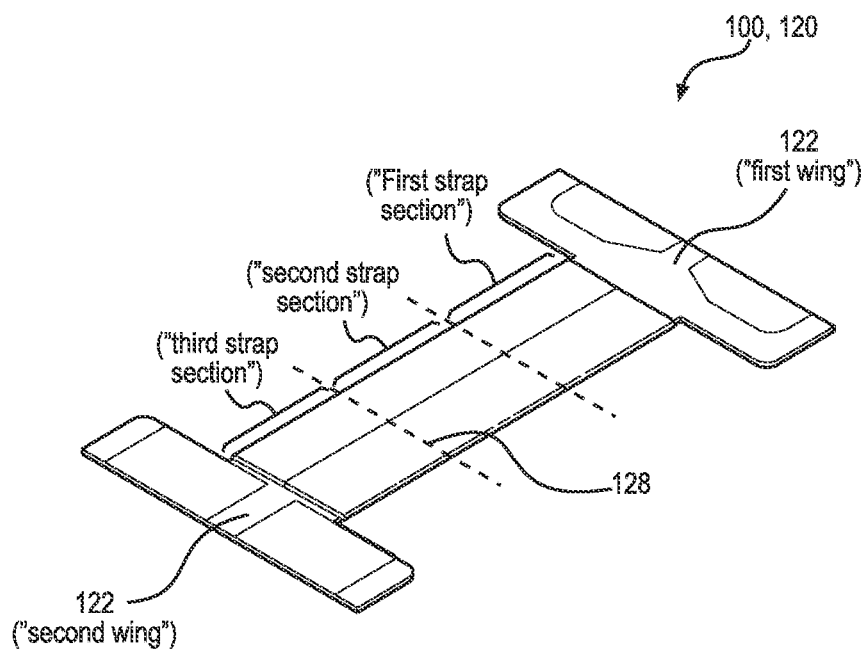

In another implementation, as shown in FIGS. 13A and 13B, the set of strap liners 128 can include a single strap liner 128 configured to encompass the set of stiffeners 124 and the second set of magnetic features 126. For example, the set of strap liners 128 can include a strap liner 128 (e.g., a textile or fabric liner) defining a first edge and a second edge opposite the first edge (e.g., when laid out flat). In this implementation, the set of stiffeners 124 (e.g., a single stiffener) can be set and aligned between the first edge and the second edge of the strap liner 128. Then, the first edge and the second edge of the strap liner 128 can be wrapped inward about the set of stiffeners 124. The first edge of the strap liner 128 can then be bonded to the second edge of the strap liner 128.

4.4 Strap Assembly

As described above, the strap 120 can be configured to include the second set of magnetic features 126, the set of stiffeners 124, and the set of strap liners 128 (e.g., fabric liners). In one implementation, the strap 120 can be formed by aligning the set of stiffeners 124—including the second set of magnetic features 126 integrated within or inserted into corresponding receptacles in the set of stiffeners 124. In one implementation, a first strap liner 128 (e.g., fabric liner) can be applied to one side of the aligned set of stiffeners 124 (e.g., underneath the set of stiffeners 124) and a second strap liner 128 can be applied to the opposite side (e.g., on top of the set of stiffeners 124). These two strap liners 128 can be bonded to one another via a heat press, thus encapsulating the set of stiffeners 124—and the second set of magnetic features 126—to form the strap 120. Additionally or alternatively, the first and second strap liners 128 can be stitched together and/or bonded with an adhesive along their edges and around the stiffeners. Alternatively, in another implementation, a single strap liner 128 can be applied to a first side of the aligned set of stiffeners 124 (e.g., underneath the set of stiffeners 124). Opposing edges of the single strap liner 128 can be bonded to one another (e.g., on a second side of the set of stiffeners 124 opposite the first side) via a heat press, thus encapsulating the set of stiffeners 124—and the second set of magnetic features 126—to form the strap 120. Additionally or alternatively, in this implementation, opposing edges of the strap liner 128 can be stitched together and/or bonded with an adhesive around the set of stiffeners 124.

4.5 Device Case Attachment

The strap 120 can include a set of coupling features 122 configured to couple the strap 120 to the device case body no.

Figure 14A:
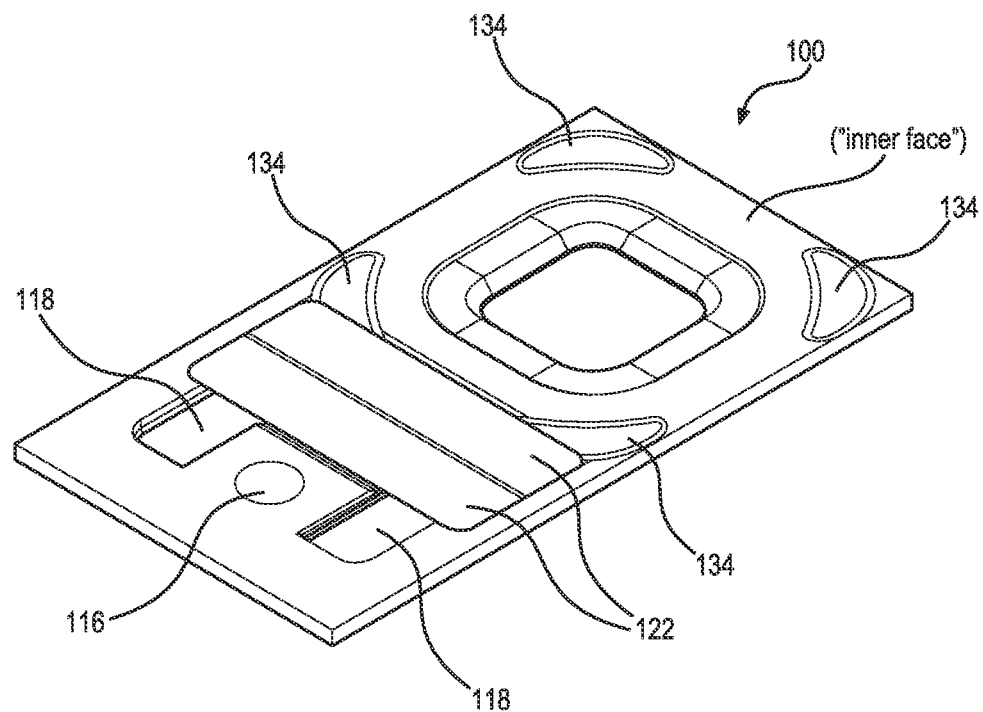
FIGS. 14A and 14B are schematic representations of the device case.
Figure 14B:
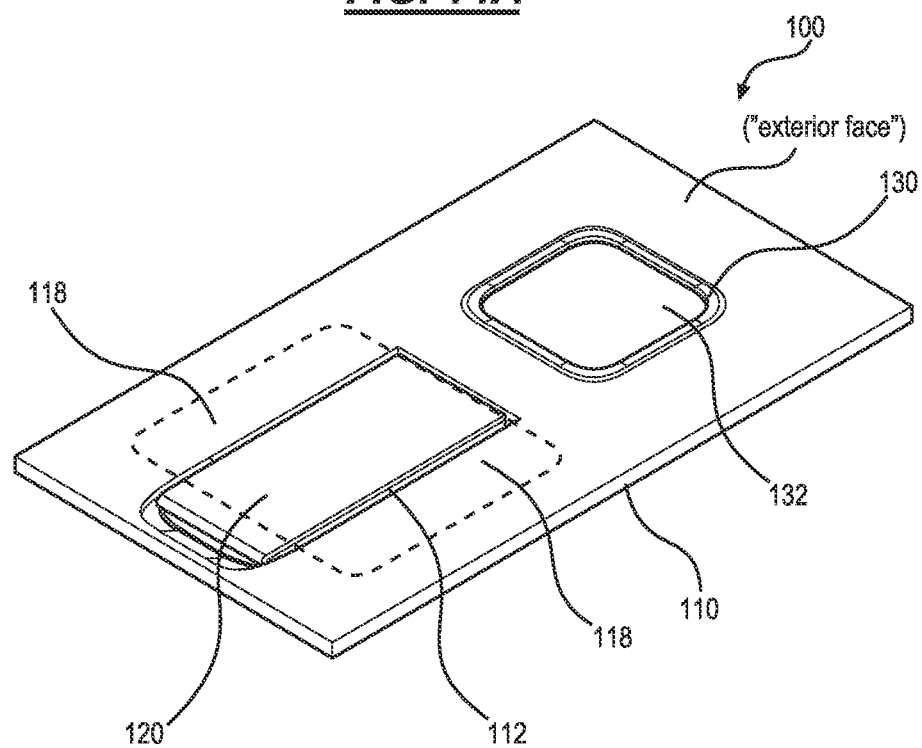

In one implementation, as shown in FIGS. 13A, 13B, and 14A, the strap 120 includes a set of wings configured to couple the strap 120 to the device case body no. In this implementation, the device case body 110 can define a set of apertures 113 proximal opposing edges of the strap receptacle 112 configured to receive the set of wings. The set of wings can be configured to insert through the set of apertures 113 and couple to the inner face of the device case body no to affix the strap 120 to the device case no.

For example, the device case body no can define a set of apertures 113 including: a first aperture arranged in a first region (e.g., an upper region) of the strap receptacle 112 and extending between the inner face and exterior face of the device case body no; a second aperture arranged in a second region (e.g., a lower region) of the strap receptacle 112 and extending between the inner face and exterior face of the device case body no; and a recess arranged on the inner face of the device case body no. The strap 120 can include a set of wings extending from edges of the strap 120 and configured to thread through the set of apertures 113 to seat within the recess and couple the strap 120 to the device case body no. In particular, the strap 120 can include: a first wing extending from (e.g., continuous with, coupled to, contiguous) the first strap section and configured to thread through the first aperture to seat within a first region (e.g., an upper region) of the recess; and a second wing extending from the third strap section and configured to thread through the second aperture to seat within a second region (e.g., an lower region) of the recess. The first and second wings can then be bonded surfaces of the recess on the inner face of the device case body no and/or to one another to couple to the strap 120 to the device case body no.

In another example, the strap 120 can include a set of two wings, each wing extending from opposite edges (e.g., vertical edges) of the fourth strap section. The device case body 110 can include a set of two apertures, each aperture located adjacent opposite edges of the strap receptacle 112 and configured to receive a wing of the strap 120. The inner face of the device case body 110 can also include a set of recesses configured to accept and retain the set of wings, such that each wing seats flush with the inner face of the device case body 110. Each of the two wings can include an adhesive layer applied to an inner surface of the wing configured to couple to the inner face of the device case body 110. In this example, the set of two wings—extending laterally from the fourth section of the strap 120—can be: inserted through the set of two apertures from the exterior face of the device case body 110 120 toward the cavity of the device case body 110; seated within the set of recesses of the inner face of the device case body 110; and then bonded to the inner face of the device case body 110 (e.g., within the set of recesses) via the adhesive layer applied to the inner surface of each of the two wings. Therefore, by bonding the wings to the inner face of the device case body 110—as opposed to the exterior face of the device case body 110—the strap 120 exhibits increased pull strength and more securely retains the strap 120 120 to the device case body 110.

Additionally, the device case body 110 can include a textile liner extending across the inner face of the device case body 110. This textile liner can further increase the pull strength of the strap 120 by compressing the set of wings against the inner face of the device case body 110 and therefore maintaining the adhesive layer of the set of wings in shear with the inner face of the device case body 110.

Alternatively, in another implementation, the strap 120 can be configured to insert into a set of apertures 113 of the device case body 110 for attachment to the device case body 110. In this implementation, the strap 120 can be configured to insert through the set of apertures 113 of the device case body no for bonding to the strap 120 itself. For example, a first end of the strap 120 can be inserted through a first aperture of the device case body 110 from the exterior face of the device case body 110 toward the cavity of the device case body no. A second end of the strap 120 can be inserted through a second aperture of the device case body 110 from the exterior face of the device case body 110 toward the cavity of the device case body 110 via a second end of the strap 120. Within the device case body no, the first and second ends of the strap 120 can be bonded to one another. By bonding the strap 120 to itself within the device case body 110, the strap 120 and the device case body 110 can cooperate to couple the strap 120 to the device case body 110 via a larger bonding surface, thereby minimizing points of failure between the strap 120 and the device case body 110. Thus, the strap 120 can more securely attach to the device case body no.

5. Magnetic Lock

The device case 100 can include: the device case body 110 including the first set of magnetic features 116; and the strap 120 including the second set of magnetic features 126. The second set of magnetic features 126 can be configured to transiently couple to the first set of magnetic features 116 to retain the strap 120 in the retracted position within the strap receptacle 112 of the device case body 110. Therefore, these magnetic features of both the device case body 110 and the strap 120 can cooperate to retain the strap 120 within the strap receptacle 112 when the user is not actively deploying the strap 120. The first set of magnetic features 116 and the second set of magnetic features 126 can include magnetic features such as: magnetic plates (e.g., steel plates); neodymium magnets; ceramic magnets; ferrite magnets; electromagnets; ferrous elements; correlated magnets; etc. The first set of magnetic features 116 and the second set of magnetic features 126 can include any combination of different types of magnetic features.

In one implementation, the strap 120 can define a default position corresponding to the retracted position. In this implementation, the device case body 110 and the strap 120 can be configured to include the first set of magnetic features 116 and the second set of magnetic features 126 such that the strap 120 automatically seats within the strap receptacle 112 in the retracted position when the user is not physically maintaining the strap 120 in the deployed position. Alternatively, in another implementation, the device case body 110 can define a default position corresponding to the deployed position. In this implementation, the device case body 110 and the strap 120 can be configured to include the first set of magnetic features 116 and the second set of magnetic features 126 such that the strap 120 remains in the deployed position even when the user is not physically maintaining the strap 120 in the deployed position.

In one implementation, the device case body 110 includes a magnetic feature 116 extending across a lower region of a base surface of the strap receptacle 112. In this implementation, the strap 120 includes a magnetic feature 126 arranged in a section of the strap 120 configured to transiently align with the lower region of the base surface of the strap receptacle 112 such that the magnetic feature 126 of the strap 120 is configured to transiently couple to the magnetic feature 116 of the device case body 110. This singular magnetic feature 126 of the strap 120 can be configured to transiently couple to the singular magnetic feature 116 of the device case body 110 to retain the strap 120 within the strap receptacle 112 in the retracted position. However, a user may quickly and easily access the strap 120 for deployment out of the retracted position and into the deployed position by overcoming magnetic forces between the magnetic feature 116 of the device case body 110 and the magnetic feature 126 of the strap 120. Alternatively, in another implementation, the device case body 110 can include multiple magnetic features 116 (e.g., two magnets, a magnet and a steel plate, two magnets and a steel plate), each magnetic feature 116 of the device case body 110 116 configured to couple to a magnetic feature 126 of the strap 120.

5.1 Magnetic Lock: Deploying the Strap

The user may remove the strap 120 from the strap receptacle 112 by applying a force to the strap 120 and/or device case body 110 that exceeds an attractive magnetic force between the second set of magnetic features 126 and the first set of magnetic features 116, thus decoupling these magnetic features of the strap 120 and the device case body no. For example, the user may insert her finger into the strap receptacle 112 of the device case body 110 and lift the strap 120 upward out of the strap receptacle 112. In another example, the user may exert a force on a bottom portion of the strap 120 (e.g., the third strap section) and push her finger upward along the device case body 110 to deploy the strap 120 into the deployed position.

In one implementation, the device case body no can include an indentation 119 along an edge of the strap receptacle 112 configured to enable the user to access and open the strap 120 from the retracted position to the deployed position. For example, the device case body no can include an indentation 119 adjacent an edge of the strap receptacle 112, such that an edge of the strap 120 adjacent the indentation 119 seats above an interior surface of the indentation 119. In this example, the user may slip her finger into the indentation 119 and under the strap 120. The user may then lift her finger outward from the device case body 110 to deploy the strap 120 from the retracted position to the deployed position.

In another implementation, the device case body 110 can include a raised section extending into the strap receptacle 112, such that the strap 120 seats within the strap receptacle 112 flush with the raised section (e.g., an inner surface of the strap 120 flush with the raised section) and does not sink within the strap receptacle 112. For example, the device case body 110 can include a raised section: extending into the strap receptacle 112; defining a width less than a width of the strap receptacle 112; and defining a height less than a height of the strap receptacle 112. An outer surface of the raised section—transiently contacting the inner surface of the strap 120 in the retracted position—can be configured to seat flush with the exterior face of the device case body 110, such that the strap 120, in the retracted position, seats flush with both the outer surface of the raised section and the exterior face of the device case body 110.

Figure 3:
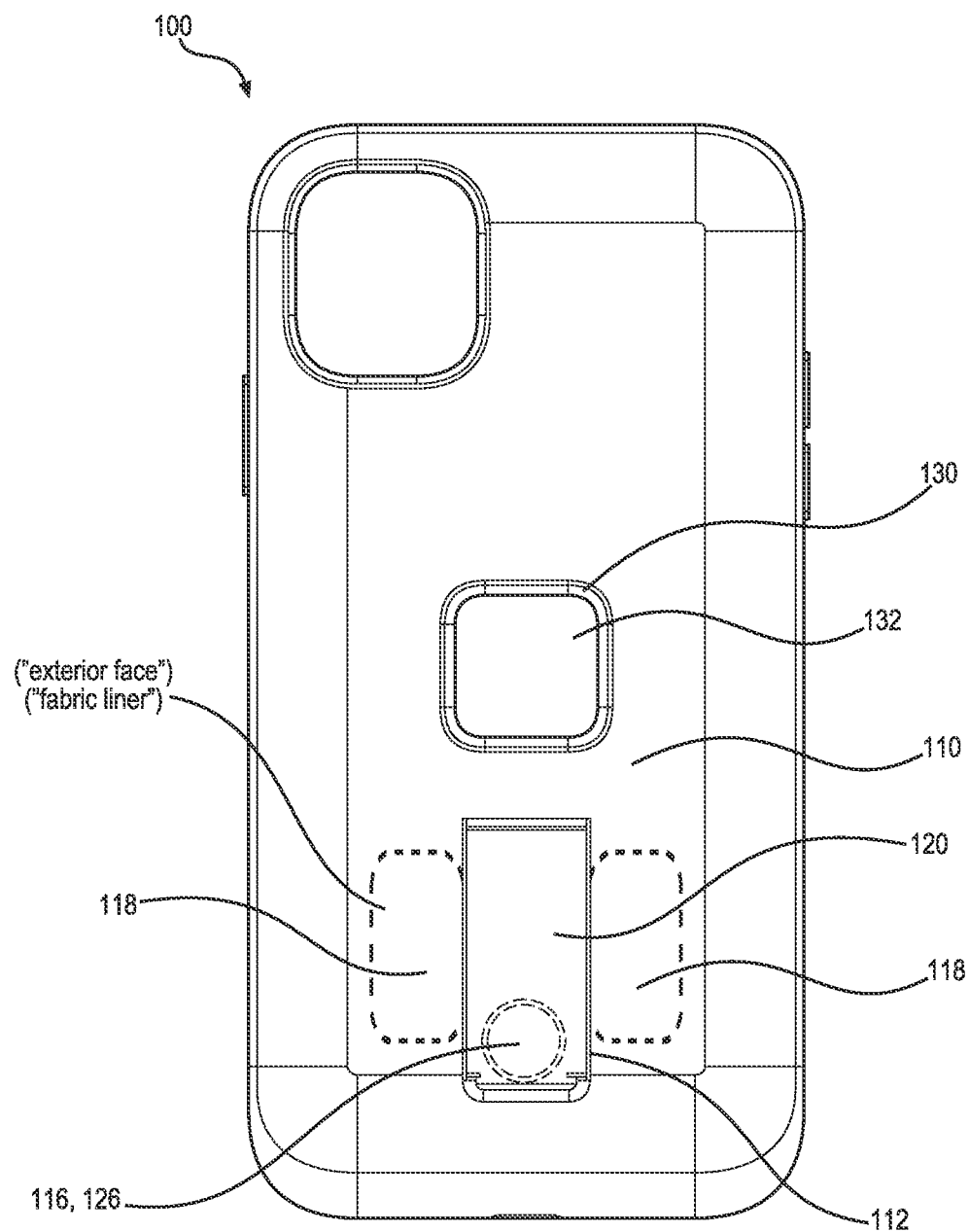
FIG. 3 is a schematic representation of the device case.
Figures 5A, 5B:
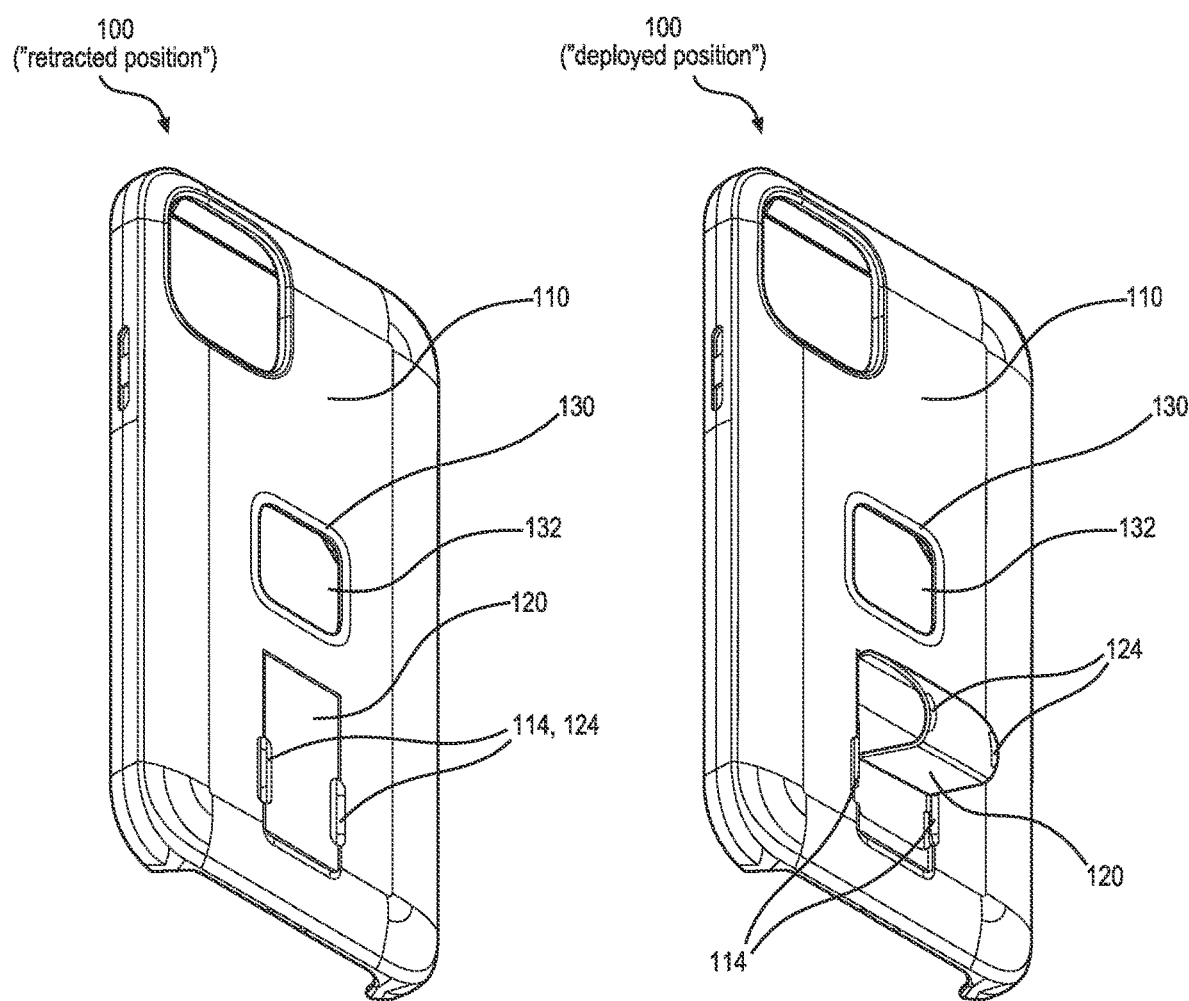
FIGS. 5A and 5B are schematic representations of the device case.
Figure 15:
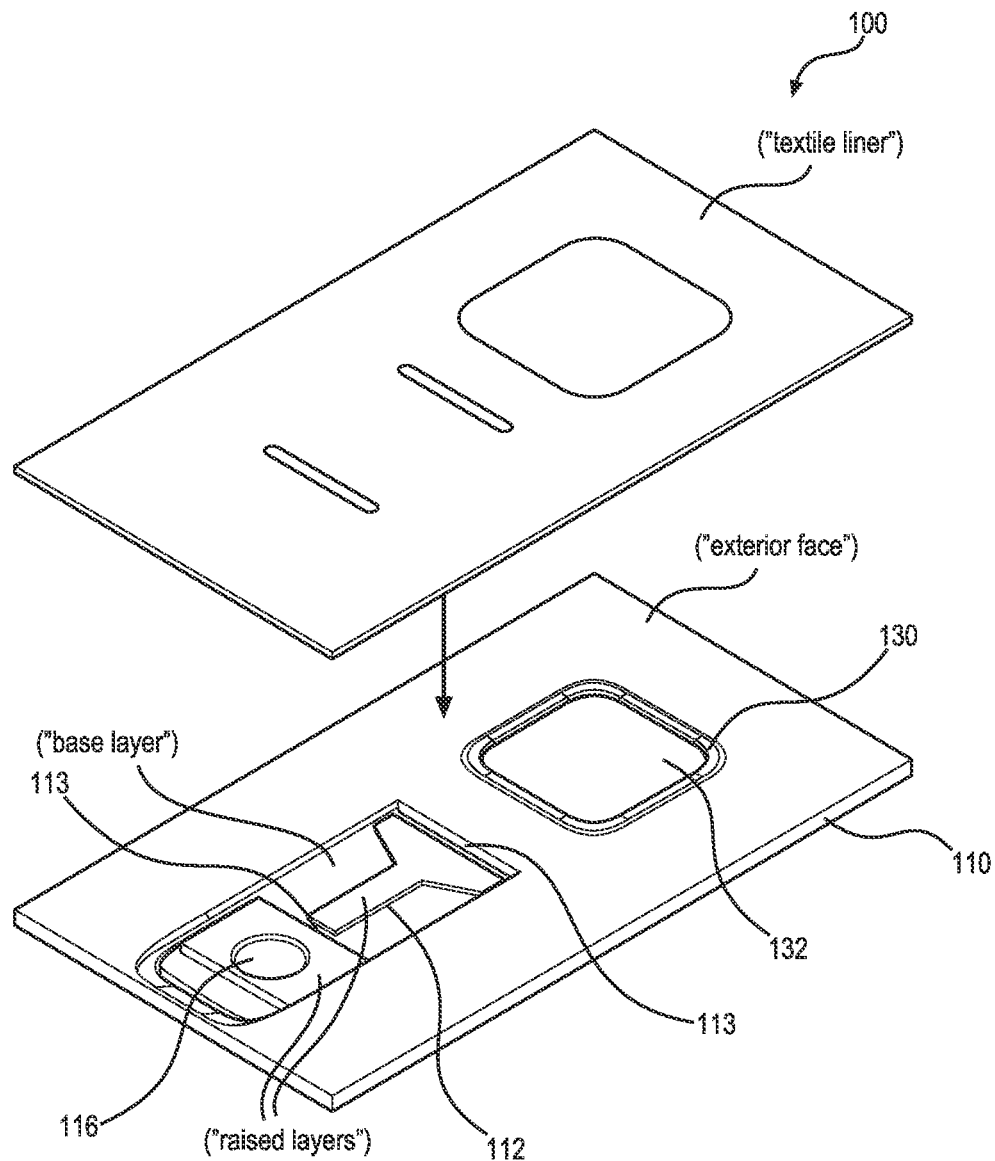
FIG. 15 is a schematic representation of the device case.

In another implementation, as shown in FIGS. 3, 14A, and 15, the device case body 110 can include the strap receptacle 112 configured to house the strap 120 in the retracted position and including: a base layer defining a first depth from the exterior face of the device case body 110; and a raised layer elevated from the base layer and defining a second depth from the exterior face of the device case body 110, the second depth less than the first depth of the base layer. The raised layer can be configured such that the second depth is approximately equivalent (e.g., within two millimeters) a height of the strap 120 in the retracted position, such that the strap 120 seats flush with the raised layer and the exterior face of the device case body 110 when in the retracted position. The raised layer can include a set of secondary apertures 118 adjacent the strap 120 in the retracted position. Further, the device case body 110 can include a textile liner (e.g., an elastic textile liner) extending across the exterior face of the device case body 110, such that the exterior face appears continuous across its full width and height when the strap 120 occupies the retracted position and the set of secondary apertures 118 are covered. In this implementation, the strap 120 can be configured to seat flush with the raised layer, above the base layer, such that the user may push her finger on a region of the textile liner aligned with a secondary aperture 118 to slip her finger underneath an edge of the strap 120 and access the strap 120 from below for deployment from the retracted position into the deployed position. Thus, the user may leverage the set of secondary apertures 118 to deploy the strap 120 from either side of the strap 120 with a single finger.

For example, the device case body no can include the strap receptacle 112 defining a width (e.g., between 1.8 inches and 2.5 inches) less than a width of the device case body no and a height (e.g., between 1.5 and 2.5 inches) less than a height of the device case body no. The strap receptacle 112 can include the base layer defining a first depth from the exterior face of the device case body 110 and a raised layer defining a second depth less than the first depth, such that the raised layer is arranged between the base layer and the exterior face of the device case no. In this example, the raised layer can include: a first secondary aperture 118 arranged within a first side of the raised layer; a second secondary aperture 118 arranged within a second side of the raised layer opposite the strap 120; and a bridge (or a "strap receiving section") extending between the first and second secondary apertures 118 and configured to receive the strap 120. The raised layer—including the bridge—can therefore be configured to seat the strap 120 flush with the base layer and the exterior face of the device case body 110 in the retracted position.

Further, in this example, the bridge can define a width less than a width of the strap 120 such that—when the strap 120 is in the retracted position—a first edge of the strap 120 extends over the first secondary aperture 118 of the raised layer and a second edge of the strap 120 extends over the second secondary aperture 118 of the raised layer. Therefore, a user may align her finger with the first secondary aperture 118 and push downward to compress the textile liner—extending across the exterior face of the device case body 110—through the first secondary aperture 118 and toward the base layer of the strap receptacle 112. The user may then slip her finger underneath the first edge of the strap 120—extending over the first secondary aperture 118—and lift her finger to lift the strap 120 from the retracted position into the deployed position. Similarly, the user may deploy the strap 120 from the opposite side of the strap 120 by compressing the second secondary aperture 118 downward and slipping her finger underneath the second edge of the strap 120. Therefore, the difference in depths of the raised layer and the base layer enable the user to access the strap 120 from below either side of the strap 120 with a single finger.

In this example, the textile liner extending across the exterior face of the device case body 110 can be formed of an elastic material, such that the textile liner is compressible by the user. Further, when forces (e.g., downward forces) on the textile liner are removed (e.g., when the user stops pushing downward on the textile liner), the textile liner can return to original form, flush with the exterior face of the device case body no.

In the preceding example, the bridge formed by the first and second secondary apertures 118 of the raised layer can include a gap splitting the bridge into a first section and a second section. By splitting the bridge into two discrete sections, the strap 120 can be inserted through this gap for securing the strap 120 to the device case body 110. In particular, the raised layer of the strap receptacle 112 can include an aperture proximal a top portion of the strap receptacle 112 directly above the bridge and configured to receive a first end of the strap 120. The bridge can include the gap (i.e., an aperture) configured to receive a second end of the strap 120 and located at a set distance from the aperture above the bridge. The first end of the strap 120 can be inserted through the aperture and the second end of the strap 120 can be inserted through gap of the bridge and threaded underneath the bridge to join the first end of the strap 120. The first and second end of the strap 120 can then be bonded for securing the strap 120 to the device case body 110.

Further, in this implementation, the user may additionally access the strap 120 from a bottom of the strap 120 by exerting a force on the bottom of the strap 120 (e.g., to overcome magnetic forces between the first set of magnetic features 116 and second set of magnetic features 126) and pushing her finger upward along the device case body no. Alternatively, the device case body no can include an indentation 119 in the raised layer proximal a bottom of the strap 120 in the retracted position, such that the user may insert a tip of her finger into the indentation 119 and push upward along the device case body no to force the strap 120 to open into the deployed position. Therefore, the user may both access the strap 120 from the bottom of the strap 120 (e.g., with one or both hands) and from the side of the strap 120 (e.g., with a single finger).

5.2 Magnetic Lock: Returning the Strap

The second set of magnetic features 126 can be configured to transiently couple to the first set of magnetic features 116 in order to (automatically) drive the strap 120 from the deployed position to the retracted position when the user removes her finger from the loop formed by the strap 120 in the deployed position. For example, when the user removes her finger from the loop of the strap 120, the strap 120 can automatically return to the retracted position—the outer surface of the strap 120 approximately flush with the exterior face of the device case body 110—such that the user may place her phone in her pocket without the strap 120 snagging on her pocket and/or obtruding from the device case body no.

In one implementation, in which the strap receptacle 112 includes the set of secondary apertures 118 as described above, the device case body 110 can include a magnetic feature 116 arranged directly below the bridge of the raised layer. In this implementation, the device case body no can include a singular magnetic feature 116 to accommodate the bridge. This singular magnetic feature 116 can be configured to transiently couple to a magnetic feature 126 arranged in a section of the strap 120 configured to align with the magnetic feature 116 when the strap 120 occupies the retracted position.

In another implementation, the device case body no can include: a first magnetic feature 116 extending across an upper region of a base surface of the strap receptacle 112; and a second magnetic feature 116 extending across a lower region of the base surface of the strap receptacle 112. In this implementation, the strap 120 can include: a first magnetic feature 126 arranged in the first strap section and configured to transiently couple to the first magnetic feature 116 of the device case body 110; a second magnetic feature 126 arranged in the second strap section; a third magnetic feature 126 arranged in the third strap section and configured to transiently couple to both the second magnetic feature 126 of the strap 120 and the second magnetic feature 126 of the device case body no.

For example, the device case body no can include: a first magnet extending across the upper region of the base surface of the strap receptacle 112; and a first steel plate extending across the lower region of the base surface of the strap receptacle 112. The strap 120 can include: a second magnet arranged in the first strap section and configured to transiently couple to the first magnet of the device case body 110; a second steel plate arranged in the second strap section; and a third magnet arranged in the third strap section and configured to transiently couple to both the second steel plate of the strap 120 and the first steel plate of the device case body 110. In this example, when the user removes her finger from the loop of the strap 120, magnetic forces between the first and second magnet of the device case body no and the strap 120, respectively, drive the first strap section toward the strap receptacle 112 of the device case body 110. As the first strap section is pulled inward toward the strap receptacle 112, the second and third strap section are also driven closer toward the strap receptacle 112, thereby increasing magnetic forces between the first steel plate of the device case body 110 and the third magnet of the strap 120. As these magnetic forces increase, the third strap section folds down such that the third magnet of the strap 120 couples to the first steel plate of the device case body 110. The second strap section is drawn toward the third section via attraction between the second steel plate of the strap 120 and the third magnet of the third strap section.

6. Variation: Mechanical Lock

In one variation, as shown in FIGS. 5A, 5B, and 11A-12K, the device case 100 includes a set of mechanical lock features configured to retain the strap 120 in the retracted position. In this variation, the device case 100 can include the set of mechanical lock features in replacement of the first set of magnetic features 116 of the device case body 110 and the second set of magnetic features 126 of the strap 120. Generally, the device case 100 can include: the device case body 110 including a first set of snap features 114 arranged within the strap receptacle 112; and the strap 120 including a second set of snap features 124 configured to cooperate with the first set of snap 114 features of the device case body 110 to transiently retain the strap 120 within the strap receptacle 112 of the device case body no. In this variation, when the user removes her finger from the loop formed by the strap 120, the first set of snap features 114 of the device case body 110 can prevent the strap 120 from automatically returning to the retracted position by blocking. Therefore, to return the strap 120 to the retracted position, the user may manually push (or "click") the strap 120 into the strap receptacle 112 and engage the second set of snap features 124 with the first set of snap features 114 to lock the strap 120 within the strap receptacle 112.

For example, the device case body no can include: a first snap feature 114 arranged adjacent a first vertical edge (e.g., corresponding to a plane defined by the device case 100 of the strap receptacle 112; and a second snap feature 114 arranged adjacent a second edge opposite the first edge of the strap receptacle 112. The strap 120 can similarly include: a third snap feature 124 arranged adjacent a first edge of the strap 120 and configured to transiently align with the first snap feature 114 of the device case body 110; and a fourth snap feature 124 arranged adjacent a second edge of the strap 120 and configured to transiently align with the second snap feature 114 of the device case body no. The user may push the strap 120 downward into the strap receptacle 112 (e.g., at a region corresponding these snap features) such that third and fourth snap features 124 of the strap 120 engage the first and second snap features 114 of the device case body no, thus locking the strap 120 into the strap receptacle 112 in the retracted position.

In one variation, the device case 100 can include the set of mechanical lock features in combination with the first set of magnetic features 116 of the device case body 110 and the second set of magnetic features 126 of the strap 120.

7. Variation: Device Case+Mount

Figure 6A:
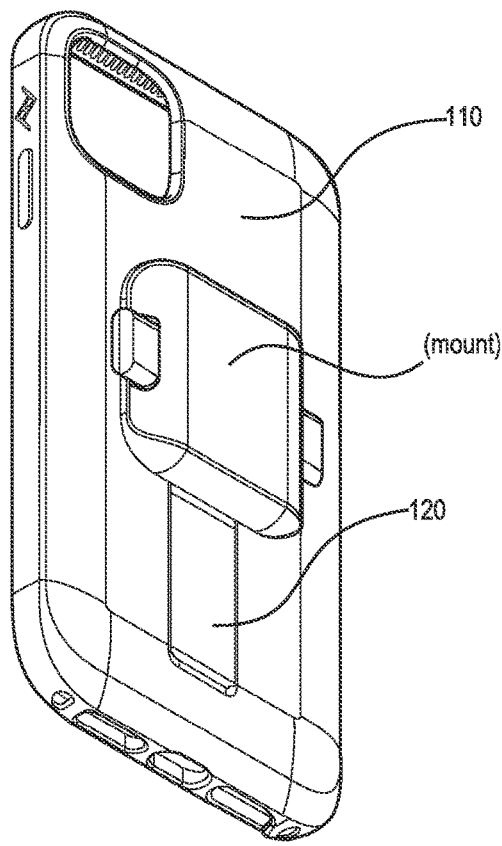
FIGS. 6A and 6B are schematic representations of the device case and mounting system.
Figure 6B:
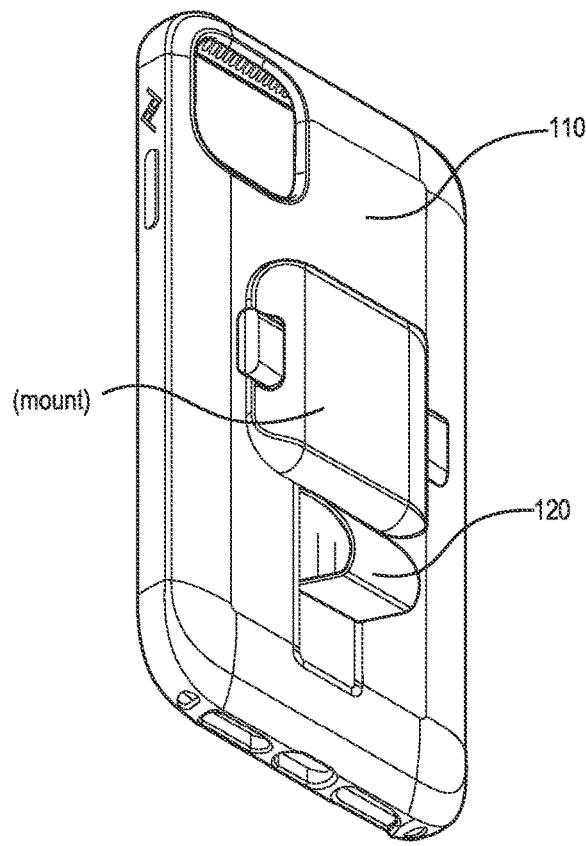
Figure 12C:
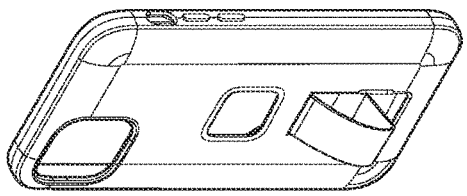
FIGS. 12A-12K are schematic representations of the device case.
Figure 12D:
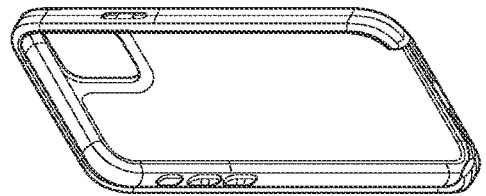
Figure 12K:
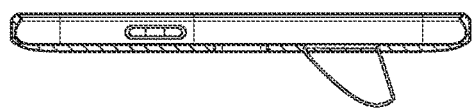
Figure 12J:
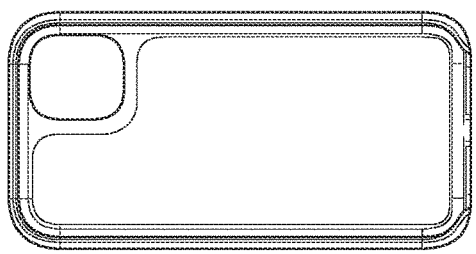
Figure 12H:
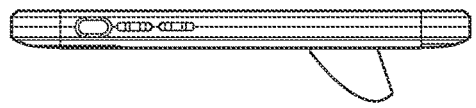
Figure 12E:
Figure 12G:
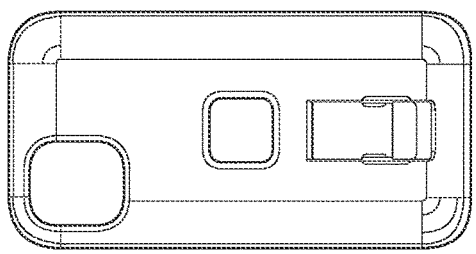
Figure 12I:
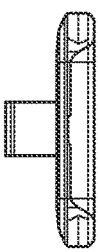
Figure 12F:
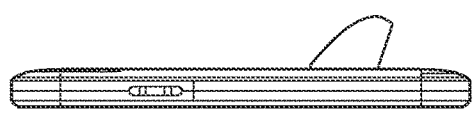
Figure 12A:
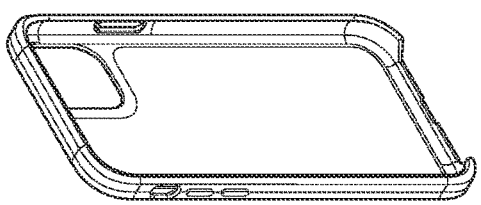
Figure 12B:
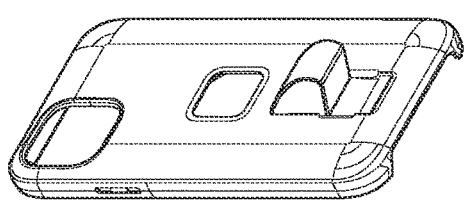

In one variation, as shown in FIGS. 6A and 6B, the device case 100 can be integrated into a mounting system—as described in U.S. patent application Ser. No. 16/945,687, filed on Jul. 31, 2020, which is incorporated in its entirety by this reference—and thus configured to couple to a set of mounts (e.g., a desk mount, a car mount, a bike mount, a tripod mount, and/or a wallet mount).

In this variation, the device case body 110 can include: an insert 130 integrated into the device case body no and defining a rectangular bore 132; and a first set of magnetic elements 134 arranged about the rectangular bore 132 and configured to transiently couple to a second set of magnetic elements of a mount. The device case 100 can be configured to retain a boss of the mount within the rectangular bore 132 on an exterior face of the device case 100, such that a user may couple her mobile device, within the device case body no, to the mount in order to affix her mobile device to a particular surface and continue viewing and/or interacting with a display of the mobile device. In this variation, the device case body no can also include a cover layer (e.g., a mylar layer) arranged on the inner face of the device case body no over the rectangular bore 132, such that the inner face of the device case body no exhibits a smooth, continuous, surface.

The device case body 110 can include the insert 130 arranged in a first region of the device case body 110 and the strap receptacle 112 arranged in a second region of the device case body no, such that a user may: support and/or carry her mobile device—housed within the device case 100—via insertion of her finger through the loop of the strap 120 in the deployed position; remove her finger from the loop to trigger the strap 120 to transition from the deployed position to the retracted position within the strap receptacle 112; and couple her mobile device to a mount without obstruction by the strap 120.

In one implementation, the device case body 110 can include: the insert 130 arranged in a first region of the device case body 110 proximal a center of the exterior face of the device case body no; and the strap receptacle 112—coupled to the strap 120—arranged in a second region below the first region (e.g., in a plane defined by the device case 100). By including the insert 130 proximal the center of the device case body 110—and therefore proximal a center of gravity of the device case 100—the device case 100 can couple to a mount (approximately) at this center of gravity and therefore exhibit limited torque on the mount, thus enabling the device case 100 and a mobile device housed within the device case 100 to balance on the mount.

In another implementation, the device case body no can include: the insert 130 arranged in a first region of the device case body no proximal a charge receiving element of the mobile device housed within the device case body no; and the strap receptacle 112—coupled to the strap 120—arranged in a second region below the first region (e.g., in a plane defined by the device case 100). By including the insert 130 proximal the charge receiving element of the mobile device, the device case 100 enables better wireless power transfer between a charging element of a mount coupled to the device case 100 and the charge receiving element of the mobile device by locating the charge receiving element within a threshold distance of the charging element when the device case 100 is coupled to the mount.

7.1 Example: Strap+Mount

For example, the user may: place her mobile phone on a mount in her vehicle as she drives to the store; remove the mobile phone from the vehicle mount when she arrives; deploy the strap 120 to securely and effortlessly hold her mobile phone as she shops and checks items off of her grocery list saved on her mobile phone; remove her finger from the strap 120—automatically triggering the strap 120 to return to the retracted position within the strap receptacle 112 of the device case body 110—to replace her mobile phone back on the mount in her vehicle as she drives back home. Later, before going to bed, the user may: deploy the strap 120 into the deployed position to read from her mobile phone; remove her finger from the strap 120—returning the strap 120 to the retracted position—and couple her mobile phone to a mount on her nightstand configured to charge her mobile phone. Therefore, the user may both deploy the strap 120 when convenient to the user for added security and comfort and transition her mobile phone—housed within the device case—between a suite of mounts (e.g., with the strap 120 in the retracted position), all while using only one hand.

8. Device Case: Example Configuration

In one example, as shown in FIGS. 1A-4B, and 13A-15, the device case 100 includes the device case body 110: defining a cavity configured to accept and retain a mobile device against an inner face of the device case body 110; defining a strap receptacle 112 arranged on the exterior face of the device case body 110; and including a first magnetic feature (e.g., a magnet, a magnetic plate, a ferrous element) arranged within the strap receptacle 112. The device case body 110 can also include a set of fabric liners (e.g., an inner and outer fabric liner) extending across surfaces of the inner and outer faces of the device case body 110.

In this example, the device case includes the strap 120: coupled to the device case body 110; configured to seat within the strap receptacle 112 in a retracted position; configured to extend outward from an exterior face of the device case body 110 opposite the inner face to accept a finger of a user in a deployed position; and including a structural element (e.g., a flexible plastic stiffener)—extending between the first and second sections of the strap 120—configured to bias the strap 120 into a planar orientation within the strap receptacle 112 in the retracted position; a second magnetic feature (e.g., a magnet, a magnetic plate, a ferrous element) embedded in the structural element (e.g., within the second strap section) and configured to transiently couple to the first magnetic feature of the device case body 110 to retain the strap 120 within the strap receptacle 112 in the retracted position; and a strap liner 128 (e.g., a fabric liner) encompassing the structural element and the second magnetic feature.

The strap 120 can also include a set of coupling features 122 including: a first wing extending from and perpendicular the first strap section; and a second wing extending from and perpendicular the third strap section. Therefore, the device case body 110 can include a set of apertures 113 configured to receive the set of coupling features 122, the set of apertures 113 including: a first aperture arranged within an upper region of the strap receptacle 112; and a second aperture arranged within a lower region of the strap receptacle 112. The device case body 110 can also include a recess—opposite the strap receptacle 112—arranged on the inner face of the device case body 110 and configured to receive the set of coupling features 122 to couple the strap 120 to the device case body 110.

The strap 120 can be configured to seat within the strap receptacle 112 in the retracted position, such that the first strap section seats within an upper region of the strap receptacle 112, and the second and third strap sections seat within a lower region of the strap 120 adjacent the first magnetic feature of the device case body 110. The second strap section—including the second magnetic feature—can be configured to seat above the third strap section within the lower region of the strap receptacle 112.

Further, the strap receptacle 112 can include a set of raised layers (e.g., arranged within the upper and lower regions of the strap receptacle 112) configured to receive the strap 120 in the retracted position, such that the strap 120 seats flush with the set of raised layers while seating above a base layer below the set of raised layers. In particular, the strap receptacle 112 can include: a first raised layer (e.g., a bridge) configured to receive the first strap section; and a second raised layer configured to receive the second and third strap sections and including the first magnetic feature of the device case body 110.

The strap receptacle 112 can further define a set of secondary apertures 118 adjacent either side of the strap 120 in the retracted position. In particular, the strap receptacle 112 can include: a first secondary aperture 118 arranged adjacent—and extending beneath a first side the strap 120 in the retracted position; and a second secondary aperture 118 arranged adjacent—and extending beneath a second side the strap 120, opposite the first side, in the retracted position. A user may therefore compress the exterior face of the device case body 110 (e.g., including a flexible fabric liner and/or thin polycarbonate material) extending over the first or second secondary aperture 118 to depress this portion of the exterior face into the corresponding secondary aperture 118—toward the base surface—and slide her finger underneath the strap 120 seated on the set of raised layers above the base surface.

In this example, the device case body 110 can further include an insert defining a rectangular bore 132 configured to accept a polygonal boss of a mount; a first set of magnetic elements (e.g., four magnets) arranged in a first pattern about the rectangular bore 132 (e.g., each magnetic element arranged adjacent a corner of the rectangular bore 132) and configured to transiently couple to a second set of magnetic elements arranged in a second pattern about the polygonal boss of the mount to transiently couple the device case body no to the mount. In this example, the insert can be arranged in a first region of the device case body 110 and the strap receptacle 112 can be arranged in a second region of the device case body 110 below the first region of the device case body 110 when the device case body 110 is in an upright position defined by the mobile device.

9. Variation: Adapter

In one variation, as shown in FIGS. 9A-10J, the strap 120 can form a strap adapter configured to transiently couple and decouple from any mobile device (e.g., smartphone, tablet), any generic device case, and/or any generic handheld electronic device. In this variation, the strap 120 adapter can include: an adapter body including the strap receptacle 112 configured to transiently house the strap 120; and the strap 120 coupled to the adapter body. The strap 120 adapter can include an adhesive coating applied to an inner face of the adapter body configured to couple the strap 120 adapter to a surface of a mobile device and/or mobile device case 100.

In one implementation, the strap 120 adapter includes: the insert 130 integrated into the adapter body and configured to transiently couple to a mount; the strap receptacle 112 configured to transiently house the strap 120; and the strap 120 coupled to the adapter body and configured to transition between the deployed position and the retracted position. For example, the strap 120 adapter can define a rectangular body including: the insert 130 arranged within a first region of an exterior face of the rectangular body and configured to couple to a polygonal boss of the mount; and the strap receptacle 112 arranged within a second region of the exterior face of the strap receptacle 112 and configured to transiently house the strap 120 in the retracted position. The strap 120 adapter can also include: a first set of magnetic elements 134 arranged about the insert 130 and configured to transiently couple to a second set of magnetic elements of the mount to drive the mount toward to the strap 120 adapter (e.g., to drive the polygonal boss of the mount into the insert 130 of the adapter body) and to retain the polygonal boss within the insert 130; and a first set of magnetic features 116 arranged across the base surface of the strap receptacle 112 and configured to transiently couple to a second set of magnetic features 126 of the strap 120 to drive the strap 120 into the strap receptacle 112 from the deployed position toward the retracted position and to retain the strap 120 within the strap receptacle 112. The strap 120 adapter can include an adhesive coating on an inner face opposite the exterior face of the adapter body, such that the user may remove a protective film from this inner face and stick the inner face of the adapter body to her mobile device (e.g., her smartphone) or a case configured to house her mobile device.

10. Variation: Kickstand

In one variation, the strap 120 can be configured to serve as a kickstand for the device case 100 and therefore maintain an orientation (e.g., landscape or portrait) of the device case 100 relative a surface (e.g., a table, a floor) on which the user rests her mobile device. For example, a user may open the strap 120 into the deployed position, and rest the third strap section against a surface of her desk to maintain her mobile phone—housed within the device case 100—in a portrait orientation. In another example, a user may open the strap 120 into the deployed position, and rest a side (e.g., defining a plane orthogonal a plane of the device case 100) of the strap 120 against the surface of her desk to maintain her mobile phone in a landscape orientation.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A device case comprising:
   a body:
      defining a cavity configured to accept and retain a mobile device against an inner face of the body;
      defining a strap receptacle; and
      comprising a first magnet arranged adjacent the strap receptacle; and
   a strap:
      flexibly coupled to the body;
      configured to seat within the strap receptacle in a retracted position;
      configured to extend outward from an exterior face of the body opposite the inner face to accept a finger of a user in a deployed position; and
   comprising:
      a structural element configured to bias the strap into a planar orientation within the strap receptacle in the retracted position;
      a second magnet embedded in the structural element and configured to transiently couple to the first magnet of the body to retain the strap within the strap receptacle in the retracted position; and
      a strap liner encompassing the structural element.

2. The device case of claim 1, further comprising:
   an insert comprising a rectangular bore configured to accept a polygonal boss of a mount to constrain the body on the mount; and
   a first set of magnetic elements arranged in a first pattern about the rectangular bore and configured to transiently couple to a second set of magnetic elements arranged in a second pattern about the polygonal boss of the mount to transiently couple the body to the mount.

3. The device case of claim 2:
   wherein the insert is arranged within a first region of the body; and
   wherein the strap receptacle is arranged within a second region of the body below the first region of the body in an upward orientation.

4. The device case of claim 1:
   further comprising a set of fabric liners extending across the exterior face of the body; and
   wherein the strap defines an outer surface configured to seat flush with the set of fabric liners in the retracted position.

5. The device case of claim 1:
   wherein the strap comprises a set of sections comprising:
      a first section extending outward from an upper region of the strap receptacle in the deployed position;
      a second section extending from the first section; and
      a third section extending from the second section and curving inward toward a lower region of the strap receptacle in the deployed position;
   wherein the structural element extends between the first section and the second section of the strap; and
   wherein the second magnet is arranged within the second section of the strap.

6. The device case of claim 5:
   wherein the first section of the strap is configured to seat within the upper region of the strap receptacle in the retracted position;
   wherein the first magnet is arranged adjacent the lower region of the strap receptacle; and
   wherein the second section of the strap is configured to seat above the third section of the strap within the lower region of the strap receptacle in the retracted position.

7. The device case of claim 5:
   wherein the body defines:
      a recess arranged on the inner face; and
      a set of apertures extending between the strap receptacle and the recess; and
   wherein the strap liner comprises a set of coupling features configured to couple the strap to the body and comprising:
      a first wing coupled to the first section of the strap and configured to thread through a first aperture, in the set of apertures, in the upper region of the strap receptacle to seat within the recess; and
      a second wing coupled to the third section of the strap and configured to thread through a second aperture in the lower region of the strap receptacle to seat within the recess.

8. The device case of claim 1:
wherein the strap receptacle comprises:
a base layer exhibiting a first depth from the exterior face; and
a raised layer:
exhibiting a second depth less than the first depth from the exterior surface; and
exhibiting a second width less than a first width of the strap;
wherein the strap is configured to seat flush with the raised layer within the strap receptacle in the retracted position;
wherein a first edge of the strap is configured to seat above the base layer on a first side of the raised layer; and
wherein a second edge of the strap is configured to seat above the base layer on a second side of the raised layer opposite the first side.

9. A device case comprising:
a body:
defining a cavity configured to accept and retain a mobile device;
defining a strap receptacle; and
comprising a first magnetic feature arranged adjacent the strap receptacle; and
a strap:
flexibly coupled to the body;
configured to seat within the strap receptacle in a retracted position;
configured to extend outward from an exterior face of the body opposite the cavity to accept a finger of a user in a deployed position; and
comprising a second magnetic feature embedded in the structural element and configured to transiently couple to the first magnetic feature of the body to retain the strap within the strap receptacle in the retracted position; and
an indentation arranged adjacent the strap receptacle on the exterior face of the body and configured to receive the finger of the user during deployment of the strap from the retracted position into the deployed position to force the strap outward from the strap receptacle.

10. The device case of claim 9:
wherein the first magnetic feature comprises a first magnet; and
wherein the second magnetic feature configured to transiently couple to the first magnetic feature of the body comprises a second magnet configured to transiently couple to the first magnet to retain the strap within the strap receptacle in the retracted position and to drive the strap from the deployed position into the retracted position.

11. The device case of claim 9:
wherein the first magnetic feature comprises a magnetic plate; and
wherein the second magnetic feature configured to transiently couple to the first magnetic feature of the body comprises a magnet configured to transiently couple to the magnetic plate.

12. The device case of claim 9:
wherein the body further defines a set of secondary apertures:
arranged adjacent the strap in the retracted position;
covered by the exterior face of the body; and
defining a depth, from the exterior face of the body, greater than a height of the strap in the retracted position; and
wherein the exterior face of the body is configured to be depressed into a secondary aperture, in the set of secondary apertures, and beneath the strap by the finger of the user during deployment of the strap from the retracted position into the deployed position.

13. A device case comprising:
a body:
configured to accept and retain a mobile device against an inner face of the body;
defining a strap receptacle; and
comprising a first set of magnetic features arranged adjacent the strap receptacle; and
a strap:
flexibly coupled to the body;
configured to retract in to seat flush with an exterior face of the body, opposite the inner face, within the strap receptacle in a retracted position;
configured to open rearward from the exterior face of the body, away from the inner face, to accept a finger of a user in a deployed position; and
comprising:
a set of structural elements configured to bias the strap into a planar orientation in the retracted position and contour about the finger of the user in the deployed position;
a second set of magnetic features configured to transiently couple to the first set of magnetic features of the body to retain the strap within the strap receptacle in the retracted position; and
a set of strap liners:
encompassing the set of structural elements and the second set of magnetic features;
configured to contact the finger of the user during deployment of the strap; and
comprising a set of coupling features configured to couple the strap to the body.

14. The device case of claim 13:
wherein the set of coupling features comprises a set of wings extending from the strap and configured to couple to the inner face of the body;
wherein the body defines:
a recess configured to accept and retain the set of wings; and
a first set of apertures arranged within the recess; and
wherein the set of wings are configured to thread through the set of apertures from the exterior face of the body toward the inner face of the body to seat within the recess.

15. The device case of claim 14:
wherein the set of wings comprises:
a first wing extending from a first end of the strap and configured to thread through a first aperture, in the set of apertures, to seat within the recess; and
a second wing extending from a second end of the strap, opposite the first end, and configured to thread through a second aperture, in the set of apertures, to seat within the recess; and
further comprising a textile liner extending across the inner face of the body and configured to compress the set of wings against the inner face.

16. The device case of claim 15, wherein the set of coupling features further comprises:
a first adhesive layer, in a set of adhesive layers, applied to a first inner surface of the first wing configured to contact the inner face of the body; and a second adhesive layer, in the set of adhesive layers, applied to a second inner surface of the second wing configured to contact the inner face of the body.

17. The device case of claim 13:
wherein the first set of magnetic features comprises a first magnet;
wherein the set of structural elements comprises a plastic stiffener;
wherein the second set of magnetic features comprises a second magnet embedded in the plastic stiffener and configured to transiently couple to the first magnet to retain the strap within the strap receptacle in the retracted position; and
wherein the set of strap liners comprises a fabric liner encompassing the plastic stiffener and the second magnet.

18. A device case comprising:
a body:
  defining:
    a cavity configured to accept and retain a mobile device;
    a strap receptacle; and
    a set of secondary apertures:
      covered by an exterior face of the body opposite the cavity; and
      defining a depth from the exterior face; and
  comprising a first magnetic feature arranged adjacent the strap receptacle; and
a strap:
  flexibly coupled to the body;
  configured to seat within the strap receptacle and adjacent the set of secondary apertures in a retracted position;
  defining a height, in the retracted position, less than the depth of the set of secondary apertures;
  configured to extend outward from the exterior face to accept a finger of a user in a deployed position, the exterior face configured to be depressed into a secondary aperture, in the set of secondary apertures, and beneath the strap by the finger of the user during deployment of the strap from the retracted position into the deployed position; and
  comprising a second magnetic feature embedded in the structural element and configured to transiently couple to the first magnetic feature of the body to retain the strap within the strap receptacle in the retracted position.

19. The device case of claim 18:
wherein the set of secondary apertures comprises:
  a first secondary aperture arranged adjacent a first edge of the strap in the retracted position; and
  a second secondary aperture arranged adjacent a second edge of the strap opposite the first edge in the retracted position;
wherein the first edge of the strap is configured to seat above a first portion of the first secondary aperture in the retracted position; and
wherein the second edge of the strap is configured to seat above a second portion of the second secondary aperture in the retracted position.

20. A device case comprising:
a body:
  defining a cavity configured to accept and retain a mobile device;
  defining a strap receptacle; and
  comprising a first magnetic feature arranged adjacent the strap receptacle; and
a strap:
  flexibly coupled to the body;
  configured to:
    seat within the strap receptacle in a retracted position; and
    extend outward from an exterior face of the body opposite the cavity to accept a finger of a user in a deployed position; and
  comprising:
    a set of structural elements configured to bias the strap into a planar orientation;
    a strap liner:
      encompassing the set of structural elements;
      configured to contact the finger of the user during deployment of the strap; and
      comprising a set of coupling features configured to couple the strap to the body; and
    a second magnetic feature embedded in a structural element, in the set of structural elements, and configured to transiently couple to the first magnetic feature of the body to retain the strap within the strap receptacle in the retracted position.

\* \* \* \* \*